United States Patent [19]

Kohashi et al.

[11] Patent Number: 4,525,727

[45] Date of Patent: Jun. 25, 1985

[54] ELECTROOSMOTIC INK PRINTER

[75] Inventors: Tadao Kohashi, Moriguchi; Hiroyuki Irie, Osaka; Susumu Ide, Katano; Hiroshi Esaki, Neyagawa, all of Japan

[73] Assignee: Matsushita Electric Industrial Company, Limited, Japan

[21] Appl. No.: 467,355

[22] Filed: Feb. 16, 1983

[30] Foreign Application Priority Data

Feb. 17, 1982 [JP] Japan ........................ 57-24729
Jun. 7, 1982 [JP] Japan ........................ 57-97934

[51] Int. Cl.$^3$ ........................ G01D 15/18
[52] U.S. Cl. ........................ 346/140 R; 346/1.1
[58] Field of Search ........................ 346/140 PD, 1.1

[56] References Cited

U.S. PATENT DOCUMENTS 4,315,267 2/1982 Sonoda et al. .............. 346/140 PD
4,396,925 8/1983 Kohashi .............. 346/140 PD

FOREIGN PATENT DOCUMENTS 0046295 8/1981 European Pat. Off. .
0048460 3/1982 European Pat. Off. .
2397944 2/1979 France .
2023961 1/1980 United Kingdom .

*Primary Examiner*—George H. Miller, Jr.
*Attorney, Agent, or Firm*—Lowe, King, Price & Becker

[57] ABSTRACT

An electroosmotic ink printer comprising a head having an array of recording electrodes successively arranged to define a print line along one edge of the head. A common electrode is provided in spaced overlying relation with the recording electrodes. Between the electrode array and the common electrode is a means for electroosmotically moving ink in a direction toward the print line and in an opposite direction depending on an electrical potential applied to the recording electrodes with respect to the common electrode. A memory stores a video input signal in a plurality of storage locations corresponding to the recording electrodes for delivery in parallel form to a modulator for generating individual recording signals corresponding to the recording electrodes. Control means activates first and second groups of the recording electrodes by successively applying the individual recording signals thereto to cause the ink to move to the print line and deactivates the remainder of the recording electrodes by successively applying a deactivating potential to the electrodes of the group other than those to which the recording signals are applied.

20 Claims, 26 Drawing Figures

ELECTROOSMOTIC INK PRINTER

CROSS-REFERENCE TO RELATED APPLICATIONS

The present invention is related to Copending U.S. patent application Ser. No. 291,502, filed Aug. 10, 1981, titled "Electroosmotic Ink Recording Apparatus" now U.S. Pat. No. 4,383,265 and Ser. No. 301,449, filed Sept. 11, 1982, titled "Electroosmotic Ink Printer", both invented by T. Kohashi and assigned to the same assignee as the present invention.

BACKGROUND OF THE INVENTION

The present invention relates to an electroosmotic ink printer, and particularly to a method for operating an electroosmotic ink printer head and an electroosmotic ink printer embodying the method.

Attempts have been made in developing an electroosmotic ink printer for high printing speed operations as shown and described in the aforesaid copending applications. Any one of such printer heads disclosed in the copending applications is adapted for use in the present invention.

A typical example of the disclosed printer head comprises a dielectric support, an array of recording electrodes successively arranged on the support and a porous member disposed on the electrode array in contact with the dielectric support. On the porous member is a mesh electrode on which is disposed a means for supplying ink so that it permeates through the mesh electrode down to the porous member. The porous member has its front edge offset from the front side of the head to which a recording sheet is provided, leaving a portion of the recording electrodes and a portion of the dielectric support to be exposed to the outside. This arrangement provides a beneficial effect on the ink by causing it converge into the forward ends of the recording electrodes.

A circuit is also disclosed which controls the application of modulated potentials simultaneously to the recording electrodes with respect to the overlying mesh electrode. Because of this simultaneous application of potentials, the potential difference between adjacent electrodes is not sufficient under certain circumstances to utilize the converging effect of the ink. This might cause ink dots to spread laterally to adjacent dot positions with the result that the reproduced image is blurred. Additionally, the simultaneous application of potentials tends to produce an excessive amount of ink near the print line posistion. If a turn-off, or disabling voltage is applied to a certain recording electrode following the printing of such excessive ink, a substantial amount of ink must be withdrawn from the print line position. However, part of the ink would inevitably be left, resulting in a smearing of images. Conversely, if a given electrode is disabled successively by continued application of turn-off voltage, a shortage of ink is likely to occur when that electrode is subsequently enabled for printing.

One approach to these shortcomings would be to permanently apply a turn-off voltage to alternate ones of the recording electrodes. However, this is only achieved at the cost of a reduction in image resolution. A second approach would be to provide a plurality of additional electrodes one on each side of the recording electrodes and apply a turn-off voltage to these additional electrodes. However, the increase in total number of electrodes presents difficulties in manufacture and in operation since the additional electrodes would also cause retraction of excessive ink which in turn requires a high voltage to move it forward.

SUMMARY OF THE INVENTION

It is therefore an object of the present invention to provide a method for operating an electroosmotic ink printer head to ensure against smearing of images and allow the printer head to successfully operate at high printing speeds and to provide an electroosmotic ink printer embodying the method.

The electroosmotic ink printer head adapted for use in the invention comprises an array of recording electrodes successively arranged to define a print line along one edge of the head, an overlying electrode means in spaced overlying relationship with the recording electrodes and means provided between the electrode array and the overlying electrode means for electroosmotically moving ink in a direction toward the print line and in an opposite direction depending on an electrical potential applied to the recording electrodes with respect to the overlying electrode means.

The stated object is obtained by storing a video input signal in a plurality of storage locations corresponding to the recording electrodes, and disabling a first group of the recording electrodes by applying thereto a first potential to cause the ink to move in the opposite direction while enabling a second group of the recording electrodes by applying thereto a second potential to cause the ink to move to the print line. Subsequently, the second group is disabled by the first potential and the first group is enabled by the second potential. The electrodes of each group are located alternately with those of the other. The alternating disablement of the electrodes keeps them from being affected adversely by the electric field generated in adjacent electrodes to provide improved definition.

Preferably, the recording electrodes are organized into a plurality of blocks each having at least five such recording electrodes, and the electrodes of each block are further organized with the corresponding electrodes of the other blocks to form at least five groups. The second, or disabling potential is applied to the electrodes of each block in such a sequence that the successively applied electrodes are spaced a distance greater than the distance at which the recording electrodes are space apart. This ensures against undesirable interference which may arise between adjacent electrodes when activated in succession.

The invention provides a printer which is adapted to receive an input signal for printing an image and includes an electroosmotic ink printer head having an array of recording electrodes successively arranged to define a print line along one edge of the head, an overlying electrode means in spaced overlying relationship with the recording electrodes and means provided between the electrode array and the overlying electrode means for electroosmotically moving ink in a direction toward the print line or in an opposite direction depending on an electrical potential applied to the recording electrodes with respect to the overlying electrode means. The printer comprises memory means for storing the input signal in a plurality of storage locations corresponding to the recording electrodes, modulating means for modulating a first electrical potential with the signals stored in the storage locations to generate individual recording signals corresponding to the recording electrodes, the first potential having a polarity which causes the ink to move to the print line, timing means for generating a timing signal to define a periodic interval during which the image is to be printed on the print line, the interval being divided into at least first and second time slots, and means for organizing the recording electrodes into first and second groups, the electrodes of each group being located adjacent to the corresponding electrodes of the other group. Control means is provided for activating a portion of the recording electrodes by sequentially applying the individual recording signals to the first and second groups during the first and second time slots respectively to cause the ink on the activated electrodes to move to the print line to form the image on a surface, and for deactivating the remainder of the recording electrodes by applying a second electrical potential to the electrodes of the group to which the recording signals are not applied, the second potential having a polarity which causes the ink to move in the opposite direction.

BRIEF DESCRIPTION OF THE DRAWINGS

These and other advantages and features of the present invention will be understood from the following detail description when read in conjunction with the accompanying drawings, in which.

DESCRIPTION OF THE PREFERRED EMBODIMENTS

Figure 1:
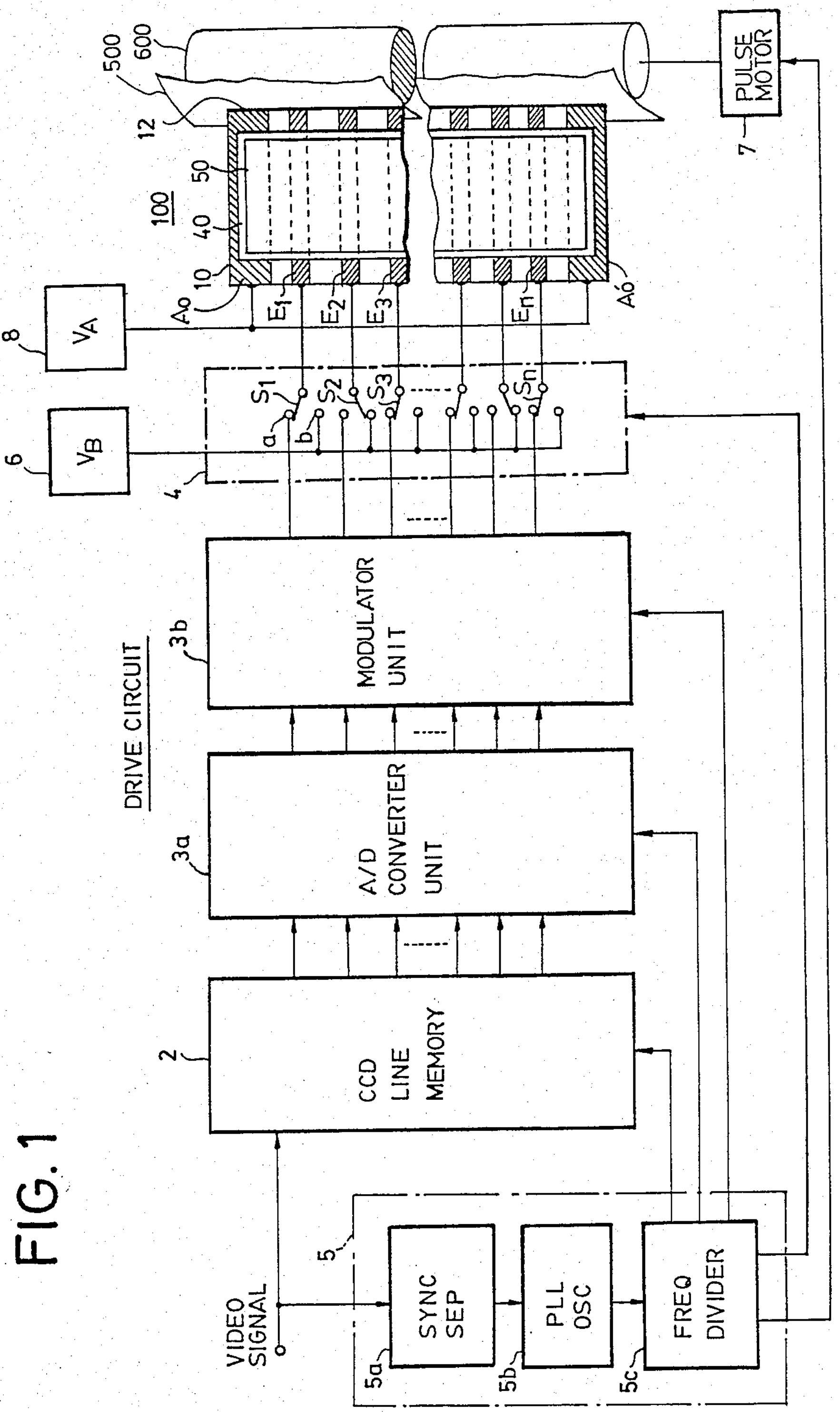
FIG. 1 is a block diagram of a first embodiment of the present invention in which the recording electrodes are alternately disabled.

Referring now to FIG. 1, the electroosmotic ink printer of the invention is schematically illustrated. Electroosmotic ink printer head 100 has an array of first, elongated recording electrodes $E_1$, $E_2$, $E_3$ . . . $E_n$ successively arranged on the surface of a dielectric support 10; each electrode extends across the front and rear sides 12 and 13 of the support 10. On the electrode array is a porous member 40 of dielectric material on which is provided a second, mesh electrode 50 which, in the illustrated embodiment, is connected to a ground terminal. As shown later, an ink supply means is provided on the mesh electrode 50. A sheet of recording paper 500 is in pressure contact with the front side 12 of the support 10 by engagement with a platen 600 to form a print line by a multitude of ink proturberances produced in a manner to be described later. The ink protuberances are at the front ends of the recording electrodes E. electrodes E. The supplied ink permeates through the mesh electrode 50 down to the porous member 40. Under the influence of potentials applied to the first and second electrodes the permeating ink is caused to electroosmoctically migrate to those of the recording electrodes which are biased negative with respect to the overlying mesh electrode 50 and collect at the front ends of such electrodes.

Since the ink has a tendency to spontaneously exude from the porous member 40 and flood the corner areas of the support including the area which contacts with the recording sheet, it is preferable that the opposite end portions of the support's upper surface be covered by auxiliary electrodes Ao and Ao' that extends between the front side 12 and the rear side 13 in spaced parallel relation with the outermost electrodes $E_1$ and $E_n$ (the spacing being substantially equal to he spacing between adjacent ones of the first electrodes).

Figure 2:
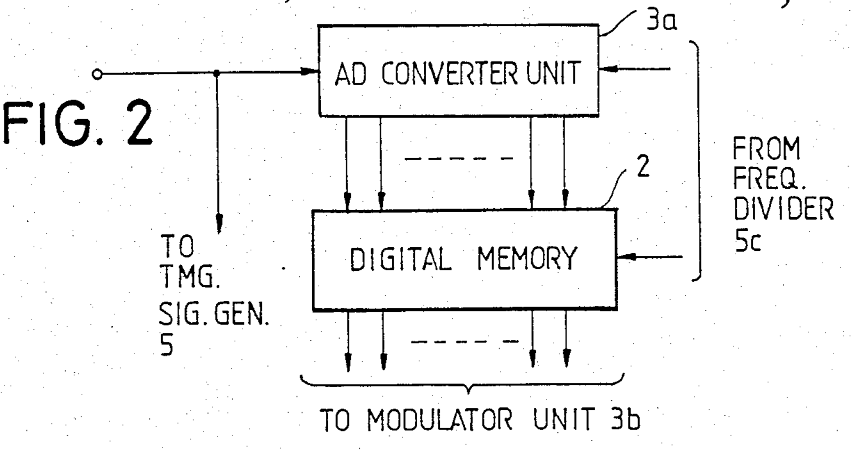
FIG. 2 is a block diagram of an alternative form of the FIG. 1 embodiment.

A dot-sequential video input signal is applied to a line memory 2. The type of video input signal may be in the form of the standard composite television signal or a facsimile signal. The line memory 2 is of an analog type memory such as charge-coupled devices to convert the dot-sequential signal to a line-sequential signal by storing the video input signal into successive dot storage positions. Memory 2 transmits the dot-position signals to a head drive circuit 3 simultaneously with the video signal being stored therein. The drive circuit 3 comprises an analog-digital converter unit 3*a* and a modulator unit 3*b*. The types of modulation suitable for the present invention include pulse-width modulation, amplitude modulation, and pulse-width amplitude modulation. Alternatively, the input video signal is converted to a digital signal by the converter unit 3a and then stored in a digital memory, such as random access memory or a shift register as shown in FIG. 2.

The video input signal is also applied to a timing pulse generator 5 which comprises a sync separator 5a for detecting the horizontal synchronization pulse, a phase-locked loop oscillator 5b responsive to the horizontal sync supplied from the separator 5a. The signal from the oscillator 5b is applied to a frequency divider 5c. The frequency divider 5c provides various timing pulses to other parts of the system. The A/D converter unit 3a is an LSI circuit which includes a plurality of A/D converters arranged in correspondence with the dot positions. The dot-position signals are converted to digital signals which are applied to the modulator unit for modulating a predetermined DC voltage to generate negative voltages of different amplitudes. For this reason, the modulator unit 3b also comprises an LSI circuit including a plurality of modulator circuits corresponding in number to the A/D converter circuits. In one application, the modulator circuits are of a well known amplitude-modulation type which modulates the amplitude of the DC voltage in accordance with the modulating digital signals. In another application, the modulator circuits are of a known pulse-width modulation type which generates a preselected amplitude pulse having a width variable as a function fo the modulating digital signals. The line memory 2, A/D converter unit 3a and modulator unit 3b all operate in unison in response to the respective timing signals supplied from the frequency divider 5c.

The modulated video signals are applied to a switching circuit 4 having a plurality of electronic switching elements $S_1$ to $S_n$; for simplicity switches $S_1$ to $S_n$ are shown as having moving contact arms connected to the recording electrodes $E_1$ to $E_n$, respectively. Each switching element has stationary terminals a and b with the terminal a being coupled to the outputs of the corresponding modulator circuits and the terminal b being coupled together to a common voltage source 6 having a positive turn-off voltage $V_B$. The odd-numbered switching elements are shown as connected to the outputs of the modulator circuits, while the even-numbered switching elements are shown as connected to the turn-off voltage source 6. This switching circuit is controlled by a timing signal supplied from the frequency divider 5c to alternately apply the turn-off and turn-on (recording signal) voltages to the associated recording electrodes. The frequency divider 5c also provides a paper advance control signal immediately following the termination of each print line to a pulse motor 7 which drives the platen 600 to successively advance the paper 500 by the width of a print line.

For the purpose of explanation it is assumed that the modulator circuits are of the amplitude modulation type.

The switching control signal is generated for each line-sequential signal so that during a first half period of each print-line interval odd-numbered recording electrodes are biased to the turn-off potential $V_B$ and even-numbered electrodes are biased individually to the potentials of the amplitude-modulated signals and during a second half period of that interval the switching elements are all transferred to apply the turn-off voltage to the even-numbered electrodes and apply the modulated potentials to the odd-numbered electrodes. Therefore, when a given electrode is applied with a modulated negative potential mesh electrode 50 or "enabled" for printing, adjacent electrodes are applied with the positive turn-off voltage or "disabled".

The auxiliary electrodes Ao and Ao′ are biased to a voltage $V_A$ from a source 8 which is positive with respect to the mesh electrode 50 to cause the ink contained in the porous member 40 to electroosmotically move in a direction from the auxiliary electrodes Ao, Ao′ to the mesh electrode 50, whereby the ink flooding the corner areas of the support 10 recedes from the front edge. The voltages $V_A$ and $V_B$ are selected to be of the same value.

In one application, the recording electrodes are provided in such a number that each pixel on the recording surface is formed by plural dots of one high discrete tone value and one low discrete tone value. In such applications, the potential of the amplitude-modulated signal is varied between the turn-off voltage $V_B$ and a negative turn-on voltage of a maximum value which is referred to as voltage $V_m$.

Figure 3:
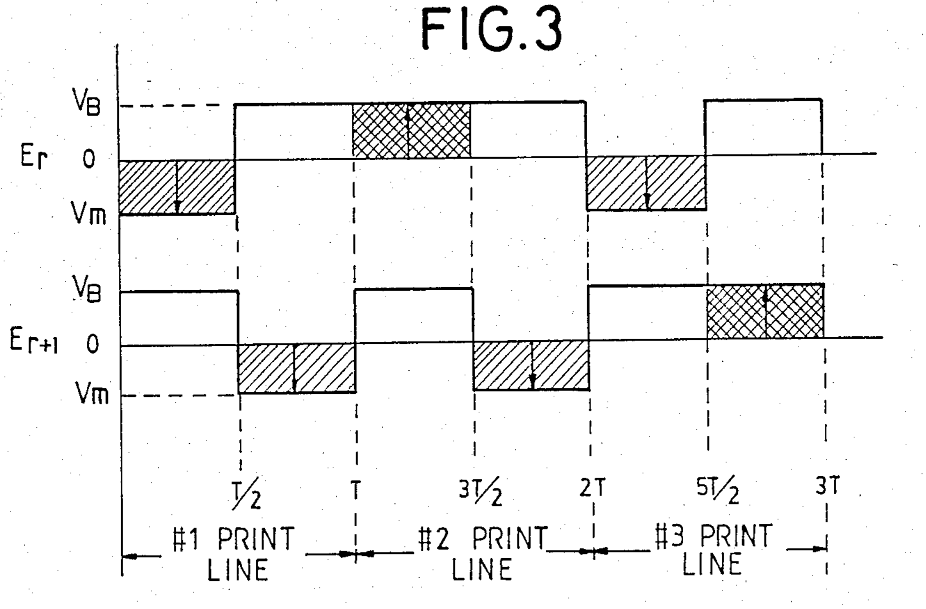
FIG. 3 is a diagram to assist in describing the operation of the FIG. 1 embodiment of waveforms for recording signals which are discretely amplitude modulated between disabling and enabling levels with a digital video signal, wherein the signals are applied to adjacent ones of the recording electrodes.

FIG. 3 is an illustration of waveforms of the discretely modulated signals applied to adjacent electrodes denominated by $E_r$ and $E_{r+1}$ (where r is an arbitrary number between 1 and $n-1$); the signals are illustrated as being for the interval of three print lines for the purpose of explanation. Hatching is used to indicate the interval of an enabled period and the tone value, with the single-hatch indicating the signal driven in a direction toward increasing the tone value and the cross-hatch indicating the signal driven in a direction toward decreasing the tone value.

Figure 4:
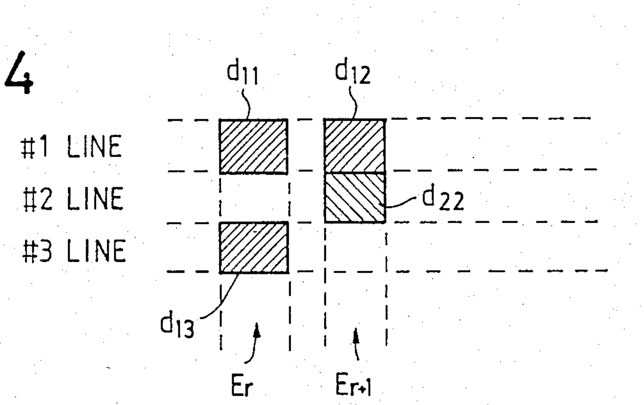
FIG. 4 is a sketch of an image produced according to the timing diagram of FIG. 3.

During the first half period of the #1 print line interval T, the electrode $E_r$ is in the enabled state and is assumed to be biased to a turn-on voltage of maximum value $V_m$, while the electrode $E_{r+1}$ is biased to the turn-off voltage $V_B$ to be disabled. During the second half period of the #1 print line interval, the electrode $E_r$ is disabled and the electrode $E_{r+1}$ is biased to a voltage modulated to the maximum turn-on level $V_m$. Therefore, black squares $d_{11}$ and $d_{12}$ are produced by electrodes $E_r$ and $E_{r+1}$ on the #1 print line as shown in FIG. 4.

During the first half period of the second time print line interval, electrodes $E_r$ and $E_{r+1}$ are enabled and disabled respectively. The potential to be applied to the enabled electrode $E_r$ is assumed to be modulated to the turn-off level $V_B$ as indicated by a cross-hatched area so that this electrode produces a blank in the #2 print line, while the electrode $E_{r+1}$ is forced to the turn-off level $V_B$. During the second half period of the #2 print line interval, electrodes $E_r$ and $E_{r+1}$ are switched to the disabled and enabled states respectively. The potential applied to electrode $E_{r+1}$ is assumed to be modulated to the negative maximum turn-on voltage $V_m$ producing a black square $d_{22}$ on the #2 print line.

Similarly, during the first half period of the #3 print line interval, electrode $E_r$ is enabled and driven to the negative maximum voltage and electrode $E_{r+1}$ is disabled, producing a black square $d_{13}$ on the #3 print line and during the second half period, the enabled electrode $E_{r+1}$ is driven to a voltage which is assumed to be modulated to the turn-off level $V_B$, thus leaving a blank in the #3 print line adjacent to black area $d_{13}$.

Figure 5:
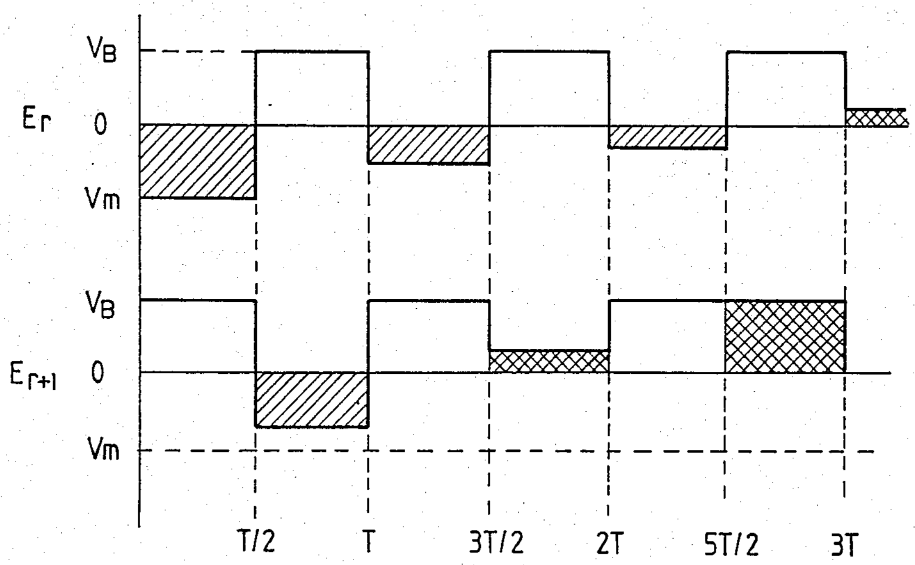
FIG. 5 is a diagram to assist in describing another operating mode of the FIG. 1 embodiment of waveforms for recording signals which are continuously amplitude modulated between disabling and enabling levels with an analog video signal, wherein the signals are applied to adjacent ones of the recording electrodes.

FIG. 5 is a waveform diagram associated with amplitude modulation which is used in applications wherein each pixel is formed by a single dot or square of half-tone value which is a function of the amplitude modulation. The potentials to be applied to the enabled electrodes are modulated continuously in amplitude between the positive turn-off level $V_B$ and the maximum negative turn-on level $V_m$. A modulated potential having the maximum turn-on level $V_m$ is shown as being applied to electrode $E_r$ during the first half period of the #1 print line interval. This produces a dot of the largest size on the #1 print line. Amplitude modulation of a lesser degree may produce a lower turn-on voltage which, when applied to electrode $E_2$ during the second half period will produce a dot of a size slightly smaller than the largest size. The half tone value is determined by the degree of amplitude modulation and thus varies as a function of voltage deviation from the turn-off level $V_B$. Thus, a half-tone value which is close to the blank level can thus be produced by application of a positive voltage close to the turn-off level $V_B$ as indicated by $V_2$.

For half-tone image reproduction, the amount of energy supplied to the enabled electrodes is not only variable in terms of voltage, but also variable in terms of pulse duration. Pulse-width modulation can thus be employed in the present invention. In this instance, the enabled electrodes are first driven negatively to the same maximum turn-on voltage $V_m$ but for different durations as a function of the desired half-tone value and then positively driven to the turn-off level $V_B$ during the rest of the enabled period.

Figure 6:
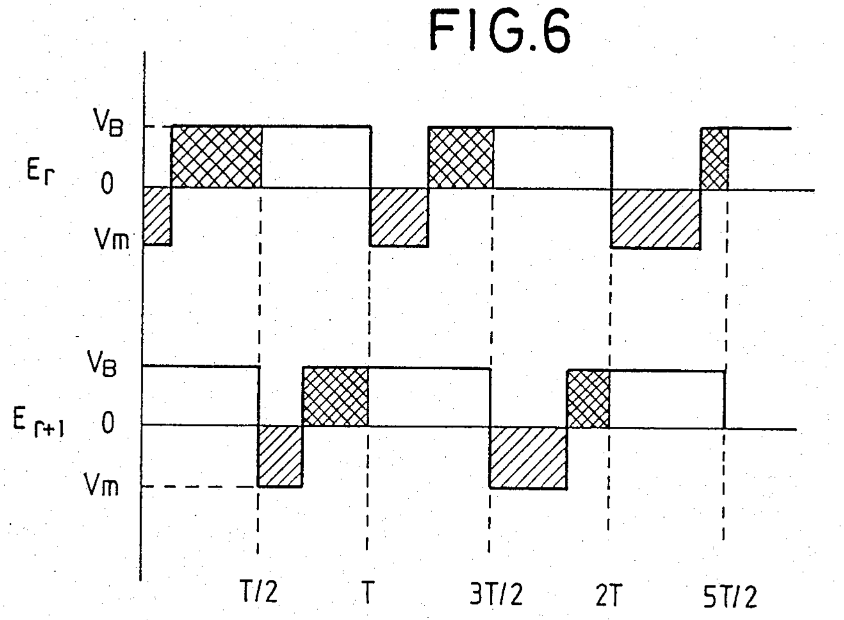
FIG. 6 is a diagram to assist in describing another operating mode of the FIG. 1 embodiment of waveforms for recording signals which are pulse width modulated according to an input video signal and applied to adjacent electrodes.

Pulse-width modulator circuits are included in the modulator unit 3*b* to effect such pulse-width modulation on each dot signal. Each of the pulse-width modulators is responsive to the digital modulating signal by generating a pulse of negative voltage $V_m$ having a variable duration corresponding to the desired half-tone density and a pulse of positive turn-off voltage $V_B$ having a duration complementary to the duration of the negative pulse. An example of the waveforms generated by such modulator circuits for electrodes $E_r$ and $E_{r+1}$ is shown in FIG. 6.

Figure 7:
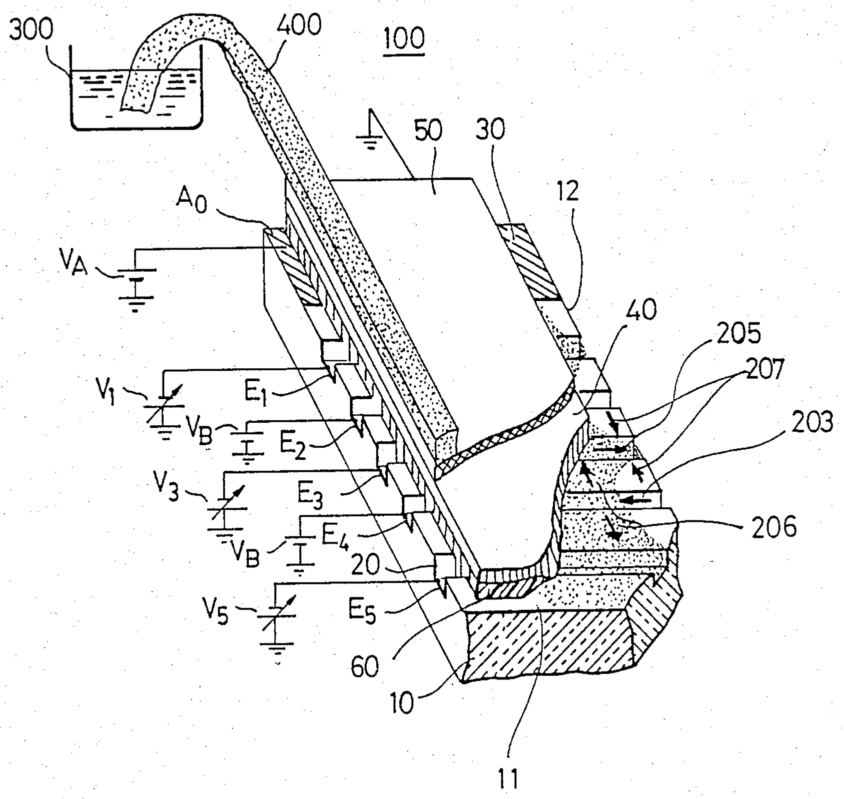
FIG. 7 is a perspective view of a typical example of electroosmotic ink printer heads which are adapted for use in the present invention.

Details of the structure and operation of the printer head 100 are shown in perspective view in FIG. 7. The recording electrodes $E_1$ to $E_n$ are provided on the upper surface of a glass support 10 at intervals of 125 micrometers in the form of grooves 20 each having a depth of 20 micrometers and a width of 50 micrometers (the spacing between adjacent electrodes being 75 micrometers). The electrodes $E_1-E_n$ and auxiliary electrodes Ao and Ao′ are made by vacuum deposition of chromium to the inner walls of the grooves to a thickness of 0.2 micrometers followe by deposition of gold to a thickness of 2 micrometers so that the overlying layer provides a mirror finish surface. The spacing between electrodes $E_1$ and Ao and the spacing between electrodes $E_n$ and Ao′, are 75 micrometers each.

The porous member 40 comprises a microporous membrane filter having a thickness of 40 to 200 micrometers and an average pore diameter of 0.1 to 8 micrometers. The porous member 40 is in direct contact with the upper surface of the dielectric support 10, the front edge of the porous member being spaced a distance of 50 to 200 micrometers from the front side 12 of the support 10 to expose a portion 30 of the upper surface of support 10 adjacent to its front side. A sealing member 60 is used to fill in the grooved electrodes to prevent backflow of ink. The front-to-rear edge dimension, i.e. thickness of the porous member 40 is typically 20 millimeters or greater. The overlying mesh electrode 50 has a mesh of 100 to 200 having a thickness of 50 to 100 micrometers to permit ink to permeate therethrough to the underlying porous member 40. The ink is supplied to the mesh electrode by means of a sponge conduit 400 from a container 300.

In FIG. 7, even-numbered electrodes are shown biased to the positive turn-off voltage $V_B$ during a given half period of a print line interval with respect to the grounded overlying mesh electrode 50 to generate an upward electroosmotic ink movement from such electrodes, causing the ink therein to move toward the rear side of the support 10. At the same time, odd-numbered electrodes are biased to different potentials of negative polarity to cause ink to flow to the front side of the support 10. The forward flow of the ink is further promoted by electroosmotic action that occurs between adjacent surfaces of the support 10 and the porous member 40. On the exposed surface portion 30 the ink is pulled in opposite directions toward the enabled odd-number electrodes as indicated by arrows 207 and collected in such electrodes to produce a flow of ink on the exposed surface 30 that converges to the front end of each enabled electrode. During the next half period, the odd-numbered electrodes are then disabled and the even-numbered electrodes are biased to turn-on voltages of different values as mentioned previously.

The converging effect just described and the alternate enablement of the recording electrodes advantageously coact with each other in eliminating the interference which might otherwise occur between adjacent electrodes, and therefore a sharply defined image is obtained. In particular, subtle differences in shading nuances of the original half-tone image can be faithfully reproduced. The periodic enablement of the recording electrodes has the effect of averaging out the required power over time, resulting in reliable printer operation. Furthermore, the oppositely moving ink flow constantly flushes the forward end portions of the recording electrodes, where the drying-up of ink would otherwise produce a residual which tends to clog the ink-flow passage. The oppositely moving ink flow also produces a kind of wiping action clearing any residual substance which might be left in the inkflow passage as a result of drying. Thus, the annoying clogging problem is automatically eliminated.

The recording electrodes $E_1$ to $E_n$ may be divided into three groups, with the electrodes of each group being arranged alternately with those of another; the electrodes of a single print line interval are also divided into equal three periods. In this configuration, the electrodes $E_1$, $E_4$, $E_7$ . . . are enabled during the first period of each print line interval, the electrodes $E_2$, $E_5$, $E_8$ . . . are enabled during the second period of that interval and then the electrodes $E_3$, $E_6$, $E_9$ . . . are enabled during the third period.

Due to the inherent viscosity of the ink that causes it to stick to the paper 500, the recording paper is advanced at a speed sufficient to allow the ink to separate completely from the recording paper. However, if the paper is advanced at higher speeds, the ink tends to trail as it separates from the paper and interferes with adjacent electrodes, causing smearing on the writing surface.

Figure 8:
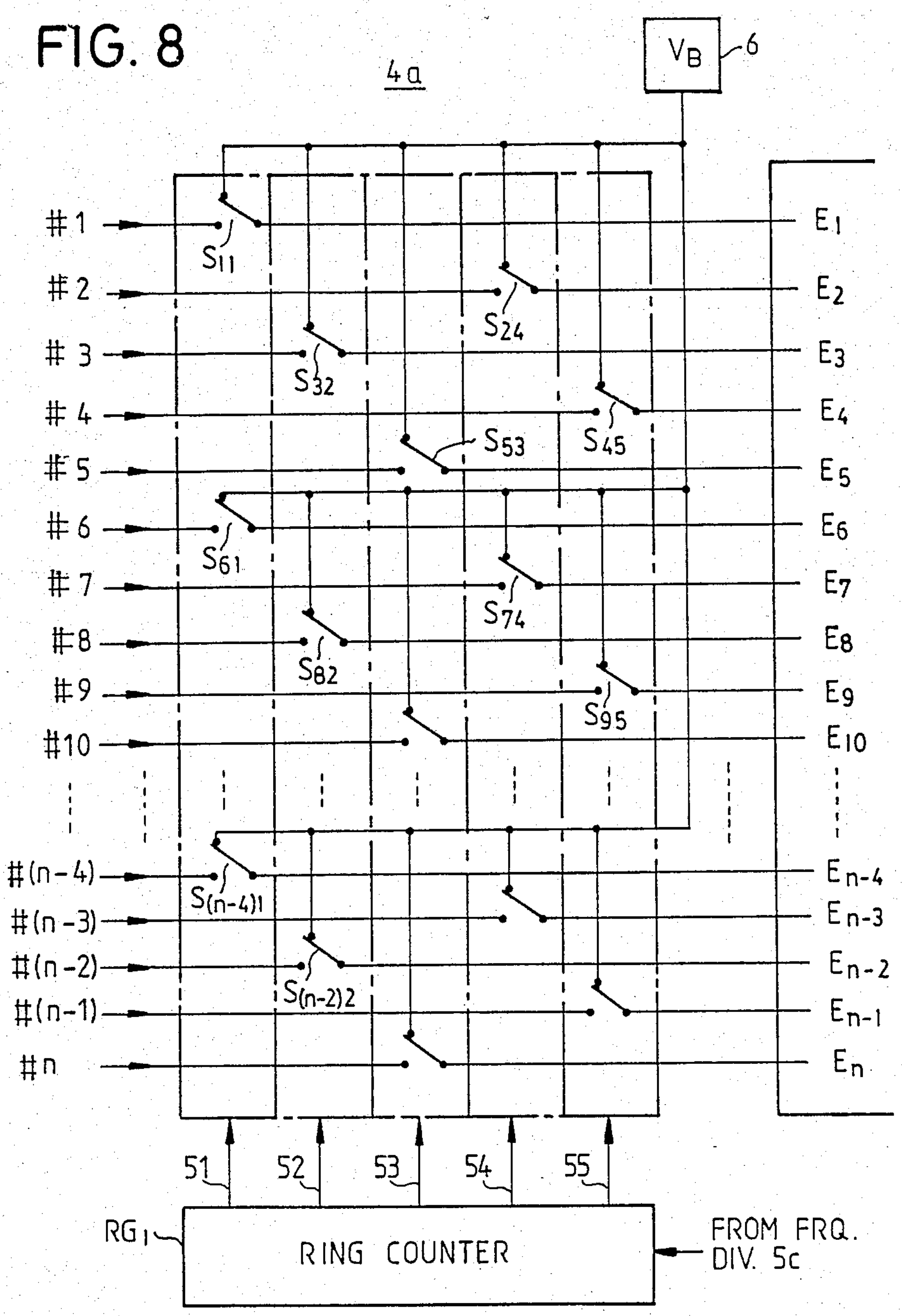
FIG. 8 is an illustration of a second embodiment of the present invention, wherein details of the switching circuit of FIG. 1 are shown.
Figure 9:
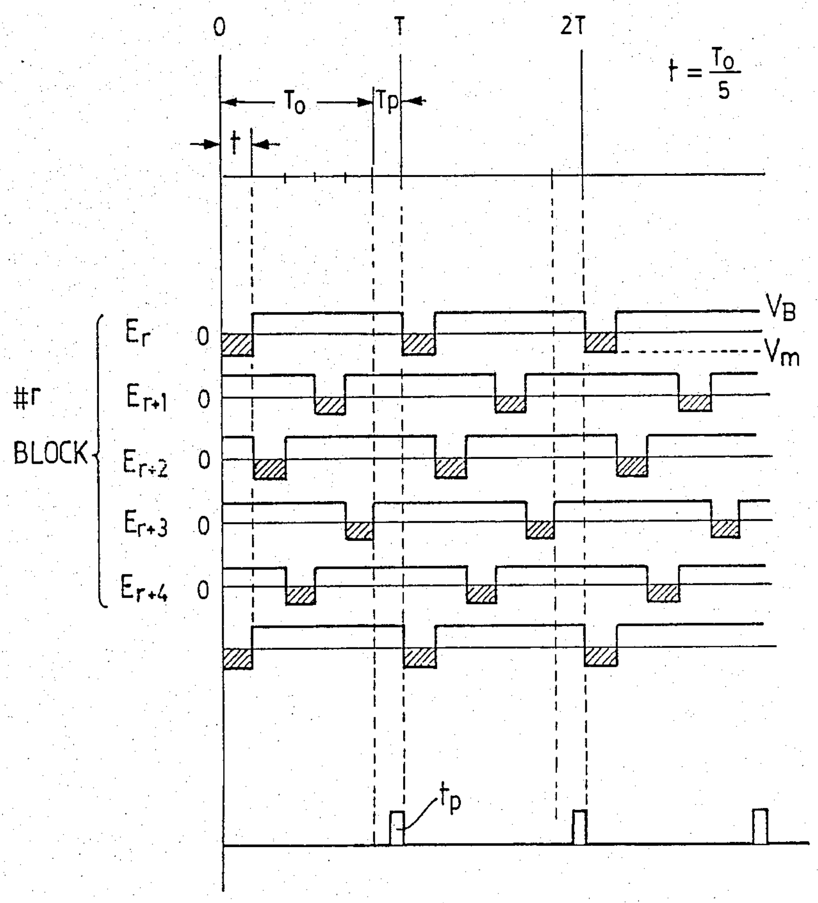
FIG. 9 is a timing diagram associated with the embodiment of FIG. 8.

FIG. 8 is an illustration of an embodiment which eliminates the above-noted problem. In this embodiment the individual circuits of the modulator unit 3*b* are divided into a plurality of blocks each having five circuits. Each of the circuits is coupled to a switching circuit 4*a* which in turn comprises a plurality of blocks of five switching elements Sxy, each arranged in a pattern of rows and columns represented by subscripts x and y to the letter S. Recording electrodes $E_1$ to $E_n$ are similarly divided into a plurality of blocks corresponding to the modulator unit 3*b*. All the switching elements $S_{xy}$ are normally coupled to the voltage source 6 to bias the electrodes $E_1$ to $E_n$ to the turn-off potential $V_B$. The switching elements $S_{x1}$ of each block are arranged in the #1 column designated 41 and associated with the #1 modulator circuit of each block to couple them simultaneously to the corresponding recording electrodes in response to an output signal on lead 51 of a ring counter $RG_1$. For example, switching elements $S_{11}$, $S_{61}$ . . . $S_{(n-4)1}$ operate to disconnect the turn-off voltage and connect the individual signals of the modulator circuits #1, #6 . . . #(n−4) to the electrodes $E_1$, $E_6$ . . . $E_{n-4}$ when an output signal appears on the lead 51. The switching elements $S_{x2}$ of each block are arranged in the #2 column 42 and associated with the #3 modulator circuit of each block to couple them simultaneously to the corresponding electrodes in response to an output signal on lead 52 of the ring counter. For example, switching elements $S_{32}$, $S_{82}$ . . . $S_{(n-2)2}$ operate to disconnect the turn-off voltage and connect the individual signals of the modulator circuits #3, #8 . . . #(n−2) to the electrodes $E_3$, $E_8$ . . . $E_{n-2}$ when an output signal appears on the lead 52. Likewise, the switching elements $S_{x3}$ of each block are arranged in the #3 column designated 43 and associated with the #5 modulator circuit of each block to couple them simultaneously to the corresponding recording electrodes in response to an output signal on lead 53 of the ring counter. The switching elements $S_{x4}$ of each block are arranged in the #4 column 44 and associated with the #2 modulator circuit of each block to couple them simultaneously to the corresponding recording electrodes in response to an output signal on lead 54 of the ring counter. Finally, the switching elements $S_{x5}$ of each block are arranged in the #5 column 45 and associated with the #4 modulator circuit of each block to couple them to the corresponding recording electrodes in response to an output signal on lead 55 of the ring counter. The input of ring counter $RG_1$ responds to the outputs from the frequency divider 5*c* so the output pulse ring $RG_1$ is recyclically applied to the output leads 51 to 55 in the order named so that the switching elements are operated successively in the order of the column number. As a result, no adjacent electrodes are successively enabled. In FIG. 9 are shown voltage waveforms applied to the electrodes $E_r$, $E_{r+1}$, $E_{r+2}$, $E_{r+3}$ and $E_{r+4}$ of the #r block. The print line interval T comprises a line shift period Tp and an interval To equally divided into five slots t. During the first time slot electrode $E_r$ is enabled and driven to a voltage which is shown corresponding to the maximum turn-on voltage Vm for the sake of brevity. During the subsequent #2 to #5 time slots, electrodes $E_{r+2}$, $E_{r+4}$, $E_{r+1}$ and $E_{r+3}$ are enabled in succession in the order named.

Therefore, it is seen that each enablement occurs such that electrodes which are sufficiently spaced from the influence of the "trailing edge" effect of the previously enabled electrodes which would interfere with adjacent electrodes when the printer of the invention is operated at high speeds. It is therefore appropriate for high speed printing that the print line interval be divided by at least five time slots and the minimum number of modulator circuits and recording electrodes within each block be likewise five. In applications where a single pixel is represented by multiple dots, a set of five electrodes can be advantageously assigned to each pixel.

A line shift pulse tp is generated within the interval Tp but delayed by an appropriate period from the termination of the #5 time slot to allow the trailing edge effect of the electrode $E_{r+3}$ to decay completely before a shift is made to the next print line.

Still higher printing speed may be achieved by curtailing the trailing edge effect using a higher turn-off voltage. However, since the turn-off time is much longer than the turn-on time for a given electrode, the increase in turn-off voltage would result in a shortage of ink at the instant the given electrode is subsequently enabled.

Figure 10:
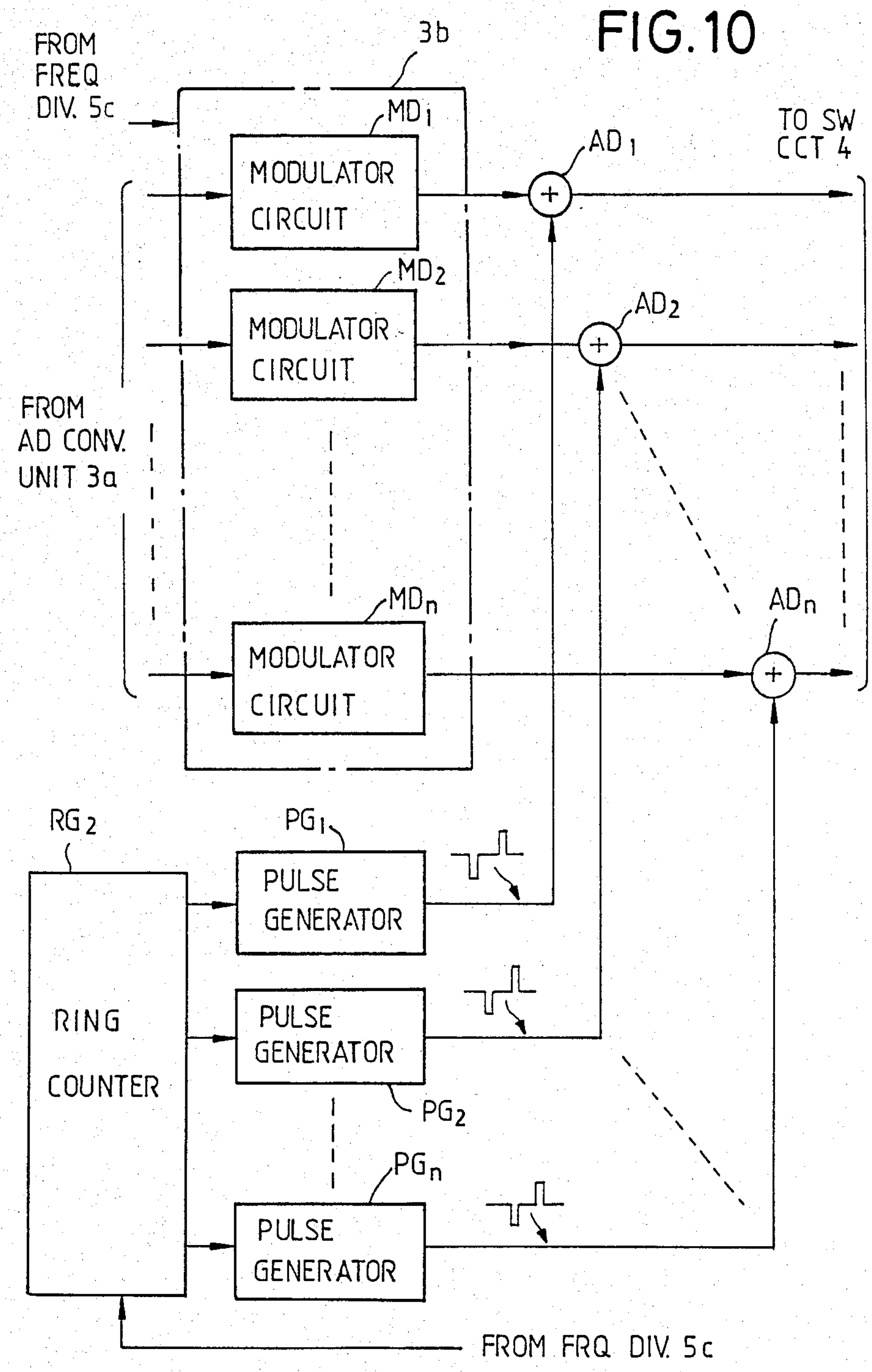
FIG. 10 is an illustration of a modified form of the second embodiment.

FIG. 10 is an illustration of an embodiment which is suitable for such higher printing operations. In this embodiment, the print line interval is divided into six time slots for purposes of illustration.

Figure 11A:
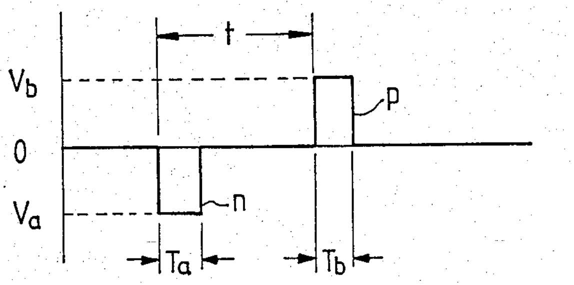
FIGS. 11*a* and 11*b* are waveform and timing diagrams, respectively, of the signals appearing in the embodiment of FIG. 10.

The embodiment of FIG. 10 comprises a plurality of pulse generators $PG_1$ to $PG_n$ corresponding to the recording electrodes $E_1$ to $E_n$, respectively. The pulse generators PG are coupled to receive a triggering signal from a ring counter $RG_2$ which is in turn coupled to the frequency divider 5*c*. As shown in FIG. 11*a*, each pulse generator is designed to generate a preceding negative-going pulse n having a duration Ta and a subsequent positive-going pulse p having a duration Tb; pulses n and p are derived in response to the recyclically generated triggering signal. The interval between the leading edge transitions of such pulses is one-sixth of the print interval To. The pulse height of the preceding and succeeding pulses is individually determined in a manner to be explained later.

Figure 11B:
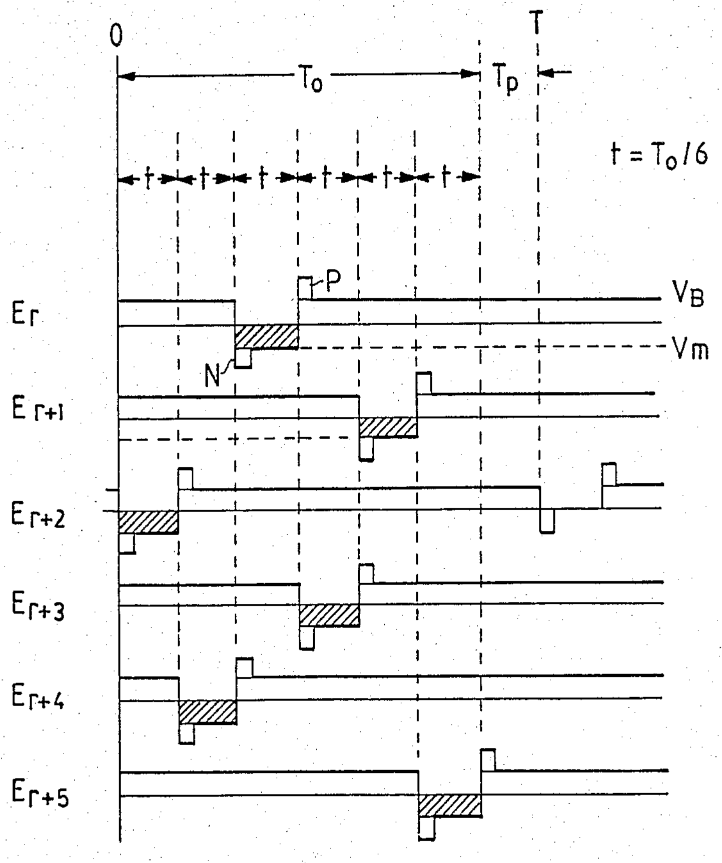

The outputs of the pulse generators $PG_1$ to $PG_n$ are applied to adders $AD_1$ to $AD_n$ to be summed with the outputs of the modulator circuits $MD_1$ to $MD_n$, respectively. The outputs of the adders $AD_1$ to $AD_n$ are applied to a switching circuit and thence to the recording electrodes $E_1$ to $E_n$. This switching circuit is generally similar to that shown in FIG. 8 with the exception that switching elements thereof are divided into six blocks instead of five. The recording electrodes are also divided into six blocks. FIG. 11*b* includes illustrations of the waveforms of the combined outputs of the adders $AD_1$ to $AD_n$ to be applied to a block of six recording electrodes $E_r$ to $E_{r+5}$. As illustrated, the combined modulated recording pulse output has a leading edge with a negative peak N extending below the maximum negative level Vm and a trailing edge with a positive peak P which is higher than the turn-off voltage $V_B$. The positive peak P reduces the turn-off time by forcibly withdraw the ink in a short period of time. The turn-off voltage $V_B$ is chosen so that it causes only a small amount of ink to recede, while the amplitude and duration of the transient turn-off pulse P are determined so that the combined energy is sufficient to produce quick withdrawal of ink at the termination of each time slot. The application of a negative peak N is effective in reducing the time taken for the ink to move forward. The amplitude and duration of this negative pulse are determined so that the pulse produces no ink trace on the writing surface when the recording signal is at the turn-off level. With this embodiment, a printing speed of as high as 10 milliseconds per line has been achieved.

For high image density reproduction the number of recording electrodes required may be greater than 1700. This requires a corresponding number of driving amplifiers and connecting wires and results in an increase in cost.

Figure 12:
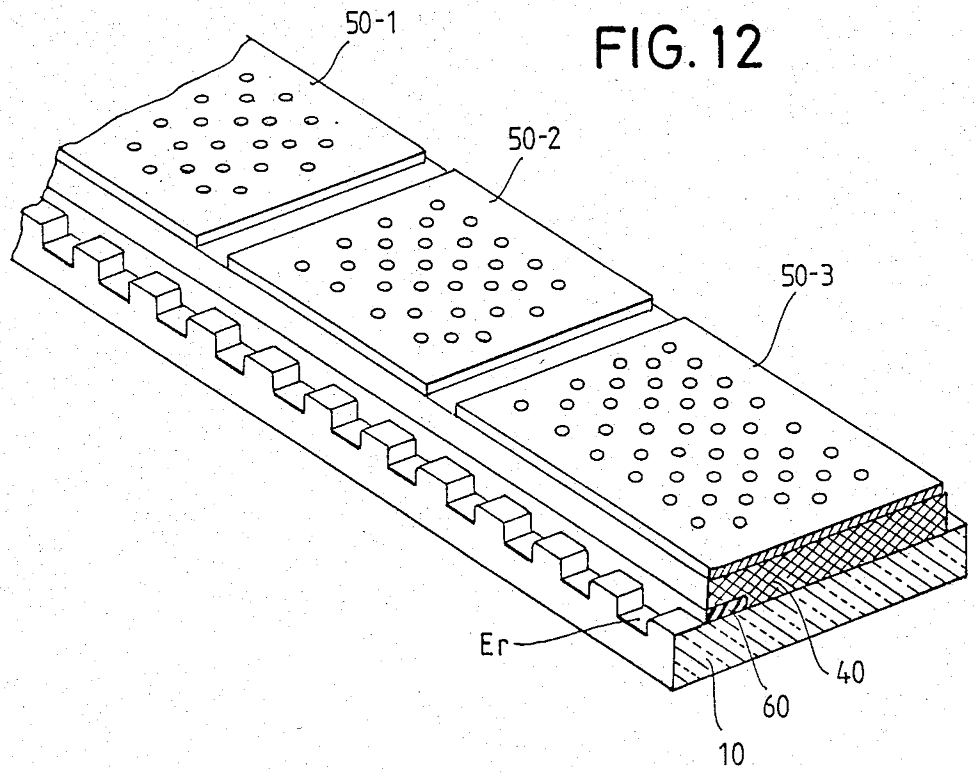
FIG. 12 is a perspective view of an electroosmotic ink printer head having a plurality of overlying segmented electrodes adapted for use in a third embodiment of the invention.

FIG. 12 is an illustration of an electroosmotic ink printer head suitable for high image density applications. This printer head is generally similar to that shown in FIG. 1, but differs in that the overlying, mesh electrode 50 is formed by a plurality of segments 50-1 to 50-k.

Figure 13A:
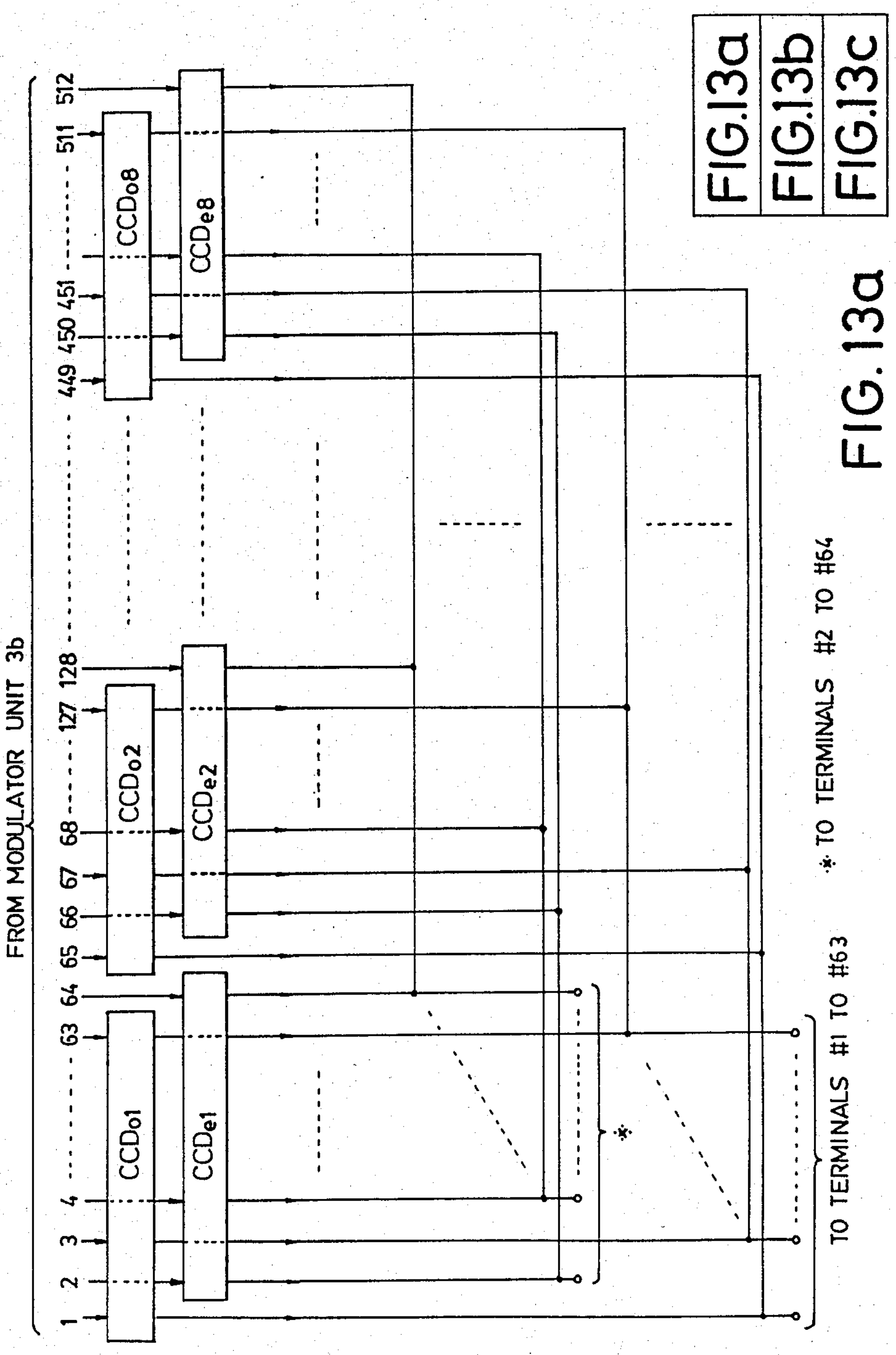
FIGS. 13*a*–13*c* and 14 are block diagrams of the third embodiment in which an even number of recording electrodes is multiplied to form a plurality of blocks.
Figure 13B:
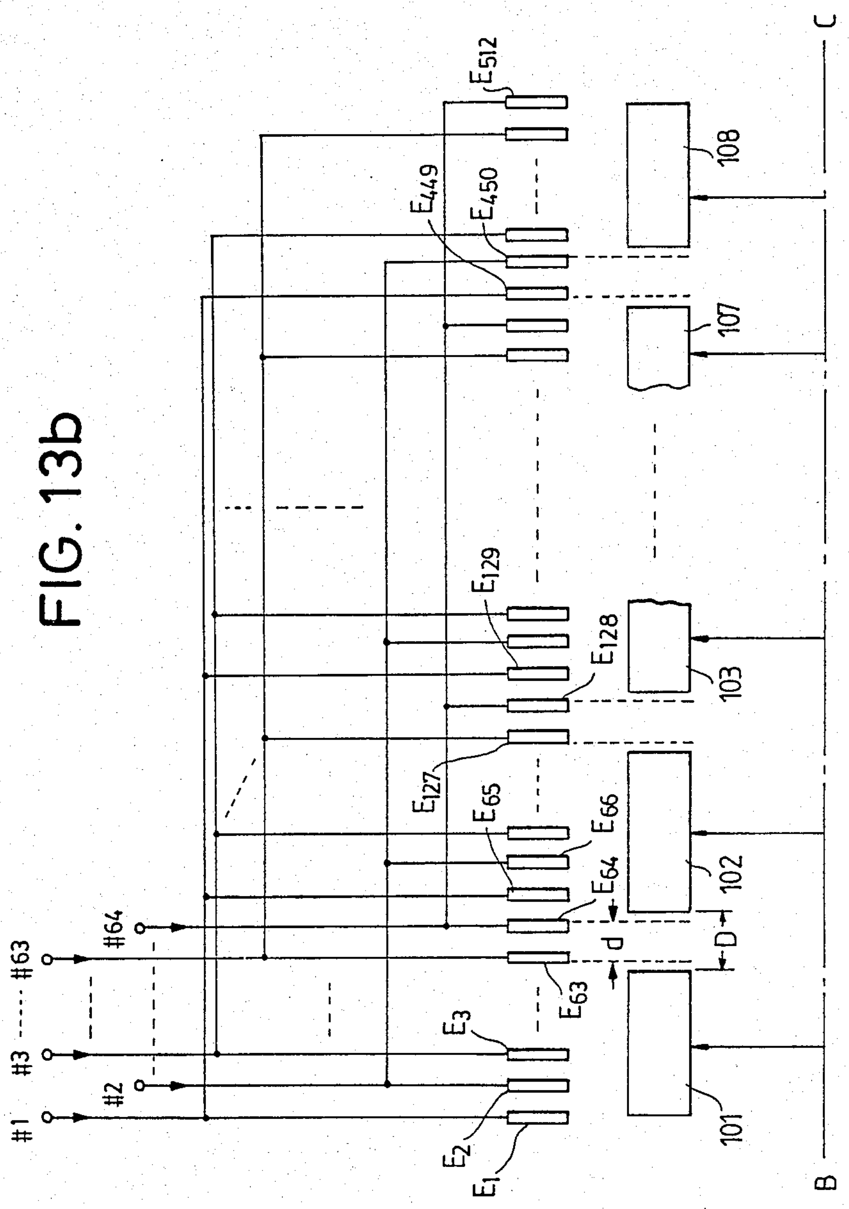
Figure 13C:
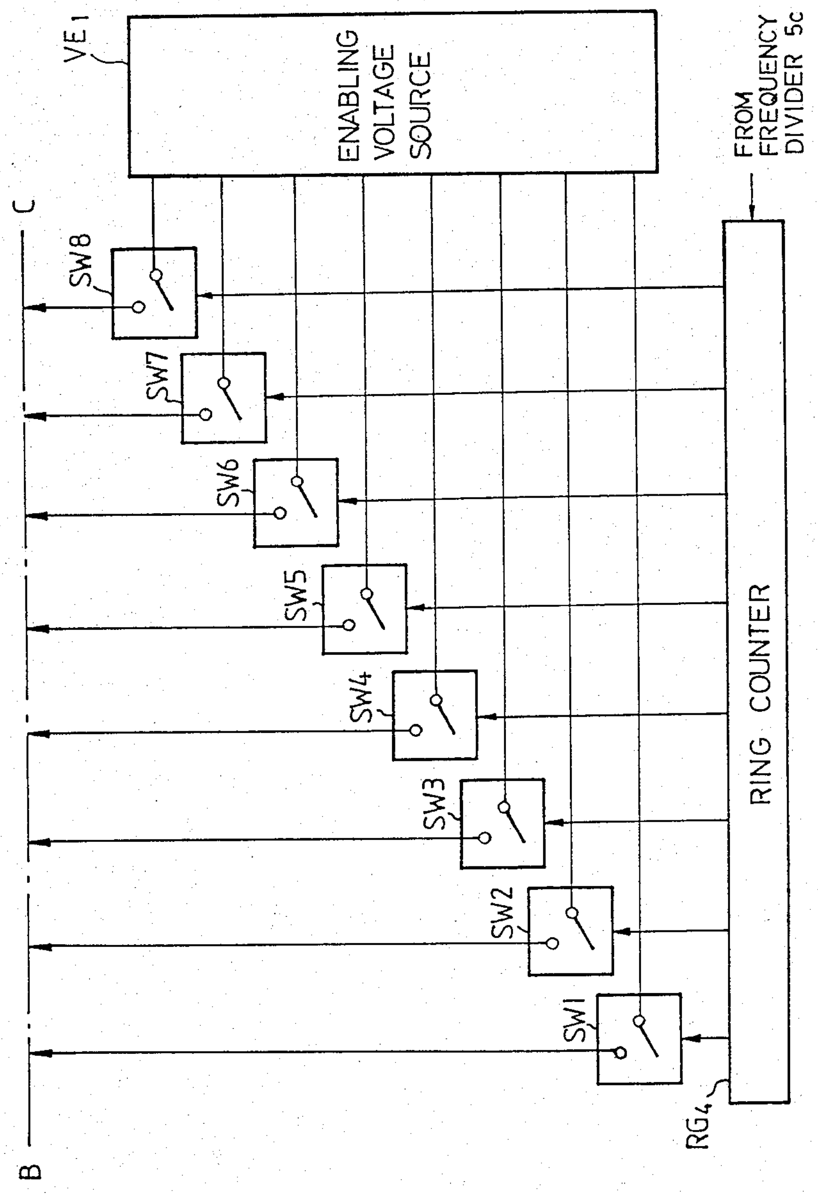
Figure 14:
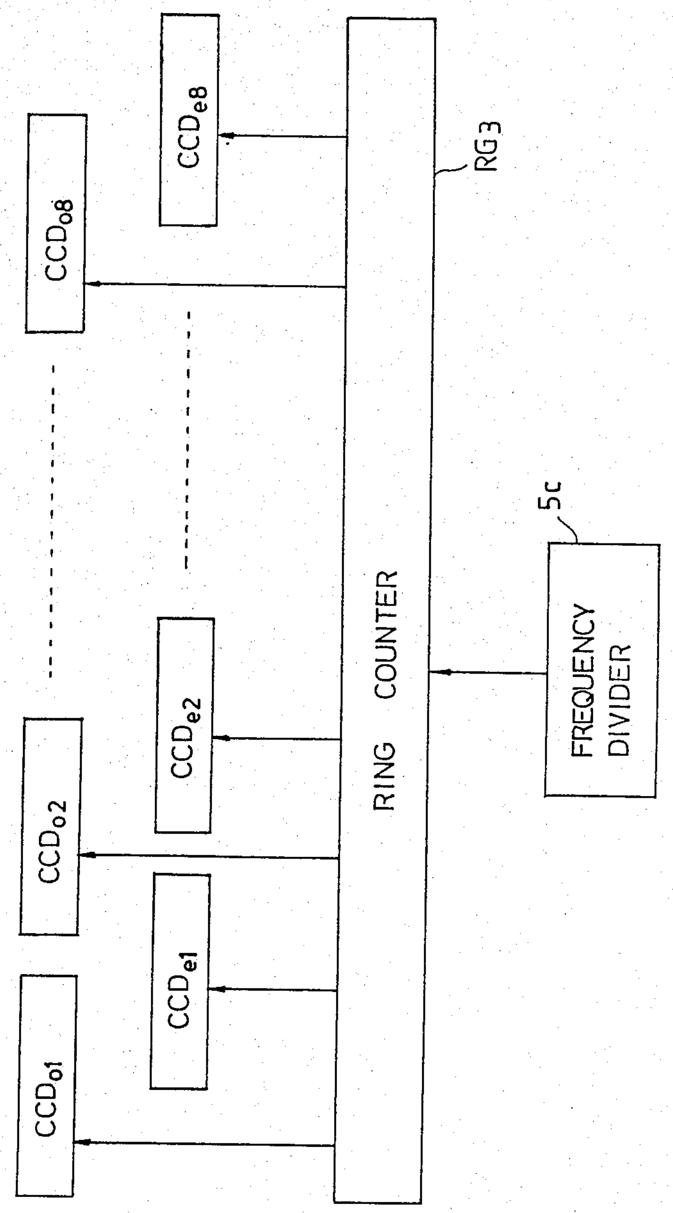

In FIGS. 13*a* to 13*c* and 14 is illustrated a switching circuit used in conjunction with the printer head of FIG. 12. The switching circuit comprises a plurality of memories represented by a first group of odd-numbered charge-coupled devies $CCD_{o1}$ to $CCD_{o8}$ and a second group of even-numbered charge-coupled devices $CCD_{e1}$ to $CCD_{e8}$. Each of the odd-numbered charge-coupled devices comprises thirty-two storage locations which are associated with corresponding odd-numbered modulator circuits. Likewise, each of the even-numbered charge-coupled devices has thirty-two storage locations associated with corresponding even-numbered modulator circuits. For example, the storage locations of charge-coupled device $CCD_{o1}$ are coupled to the #1, #3 . . . #63 modulator circuits and the storage locations of charge-coupled device $CCD_{o8}$ are coupled to the #449 to #511 modulator circuits, while the storage locations of device $CCD_{e1}$ are associated with the #2 to #64 modulator circuits and the storage locations of device $CCD_{e8}$ are associated with the #450 to #512 modulator circuits. As shown in FIG. 14, a ring counter $RG_3$ alternately enables the odd- and even-numbered charge-coupled devices and advances the enabling from a lesser to a higher numbered device in response to an output from the frequency divider 5*c*.

The corresponding output terminals of odd-numbered charge-coupled devices are multiplied for connection to odd-numbered inter-connecting terminals #1 to #63 and the corresponding output terminals of even-numbered charge-coupled devices are multiplied for connection to even-numbered inter-connecting terminals #2 to #64.

As illustrated in FIG. 13*b*, the odd-numbered recording electrodes are divided into eight blocks of thirty-two each. The electrodes of the first odd-numbered block are multiplied to the corresponding electrodes of the other odd-numbered blocks for connection to the #1 to #63 odd-numbered inter-connecting terminals. For example, electrodes $E_1$, $E_{65}$, $E_{129}$ . . . $E_{449}$ are coupled together to the #1 inter-connecting terminal. Similarly, the even-numbered recording electrodes are divided into eight blocks of thirty-two each; the corresponding electrodes of these blocks are multiplied for connection to the #2 to #64 even-numbered inter-connecting terminals. An array of eight mesh electrodes 101 to 108 is provided, each being in overlying relationship with the recording electrodes of a corresponding pair of odd- and even-numbered blocks. For example, the mesh electrode 101 overlies the recording electrodes $E_1$, $E_2$ . . . $E_{63}$, and $E_{64}$.

When enabled, each of the charge-coupled devices transfers the stored dot signals simultaneously to the associated inter-connecting terminals. Therefore, it is seen that the odd-and even-numbered electrodes that underlie each mesh electrode are alternately enabled.

The mesh electrodes 101 to 108 are biased by enabling voltages supplied from a circuit shown in FIG. 13*c*. This circuit comprises a plurality of analog switches $SW_1$ to $SW_8$ supply which a turn-on voltage to a selected mesh electrode from an enabling voltage source $VE_1$. The analog switches $SW_1$ to $SW_8$ are controlled in succession by an output pulse recyclically supplied from a ring counter $RG_3$ which is responsive to an output of the frequency divider 5*c*.

Figure 16:
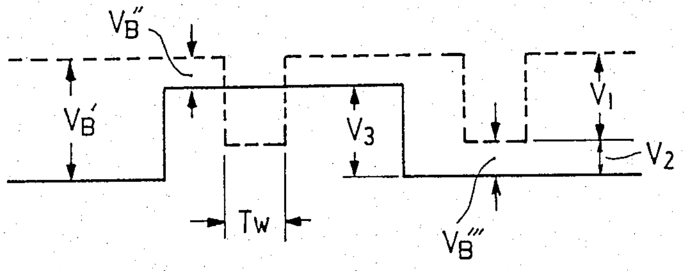
FIG. 16 is a diagram associated with the third embodiment of waveforms applied respectively to a given recording electrode and an associated overlying segmented electrode.
Figure 15:
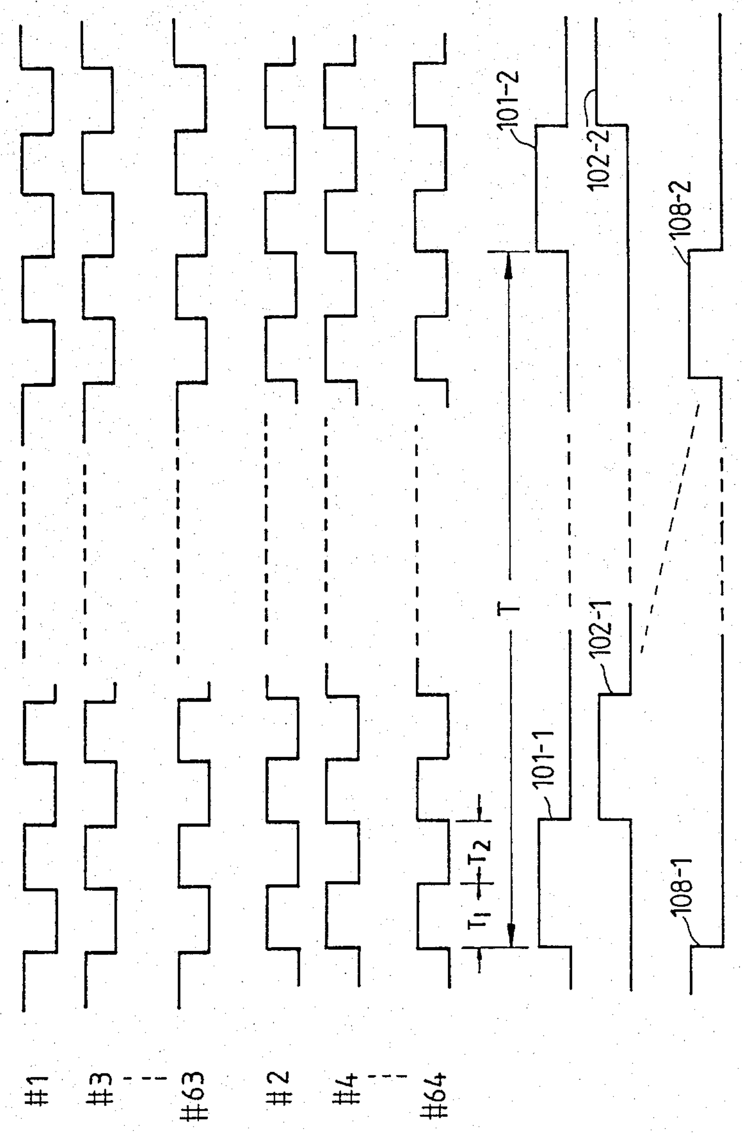
FIG. 15 is a timing diagram useful for describing the operation of the third embodiment.

The operation of the switching circuit of FIGS. 13*a* to 13*c* is visualized with reference to waveforms shown in FIGS. 15 and 16. In FIG. 15, the numerals shown at the left of the waveforms indicate the recording electrodes which are coupled to the corresponding inter-connecting terminals #1 to #64. For the sake of brevity, these waveforms are described, for the time being, as being a rectangular pulse lasting for the full length of the enabled period.

The print line interval T is divided into eight equal time slots and each time slot is further subdivided into first and second half periods $T_1$ and $T_2$. The odd-numbered electrodes $E_1$ to $E_{63}$ are enabled simultaneously during the first half period $T_1$ of the first time slot and the even-numbered electrodes $E_2$ to $E_{64}$ are enabled simultaneously during the second time slot of the same time slot. During this first time slot, the mesh electrode 101, which overlies the electrodes E1 to E64, is enabled by a pulse 101-1. In like manner, during the first half period of the second time slot the odd-numbered electrodes $E_{65}$ to $E_{127}$ are simultaneously enabled and during the second half period of the same time slot the even-numbered electrodes $E_{66}$ to $E_{128}$ are simultaneously enabled. At the same time, the second mesh electrode 102 is enabled during this second time slot by a pulse 102-2. This process is repeated until the recording electrodes $E_{450}$ to $E_{512}$ are enabled simultaneously with the mesh electrode 108 during the eighth time slot.

FIG. 16 is an illustration of the time and amplitude relationships between two pulse signals applied respectively to a given recording electrode and the associated mesh electrode. The broken-line waveform represents the signal applied to the recording electrode; it has an amplitude $V_{A0}$ with a duration Tw. The solid-line waveform indicates the signal applied to the associated mesh electrode. The latter signal has an amplitude $V_{C0}$. If these signals have the amplitude relationships given by $$V_1 + V_2 \geqq V_3$$

$$0 \leqq V_2 < V_3,$$

then the given recording electrode is driven negative sufficiently with respect to the associated mesh electrode to produce a dot. Voltages $V_B'$, $V_B''$ and $V_B'''$, the differences between the two pulse signals, are appropriately chosen to drive the recording electrode positive sufficiently with respect to the mesh electrode to disable that recording electrode.

It will be seen from the above that the number of connecting wires between the printer head 100 and the head control circuit are reduced by the factor of eight. Therefore, the number of amplifiers required can be drastically reduced.

Returning to FIG. 13*b*, it is preferable that the mesh electrodes 101 to 108 be spaced apart a distance D which is greater than the distance d between the outer edges of two adjacent recording electrodes. For example, the mesh electrodes 101 and 102 are spaced apart a distance greater than the distance between the outer, i.e., remote, edges of the recording electrodes $E_{63}$ and $E_{64}$. With this arrangement, the electrode $E_{63}$, when enabled with respect to the electrode 101, acts as a shield between electrodes 101 and $E_{64}$. Conversely, the electrode $E_{64}$, when enabled with respect to electrode 102, now acts as a shield between electrodes 102 and $E_{63}$. Such shielding effects effectively prevent electromagnetic cross-coupling between undesired electrodes.

While in the embodiment of FIGS. 13*a*–13*c*, each mesh electrode is associated with a block of an even number of recording electrodes, it is also possible to form the block with an odd number of recording electrodes. However, the alternate embodiment of odd- and even-numbered recording electrodes just described results in a simultaneous enablement of the last one of a preceding block and the first one of a succeeding block.

Figures 17A, 17B:
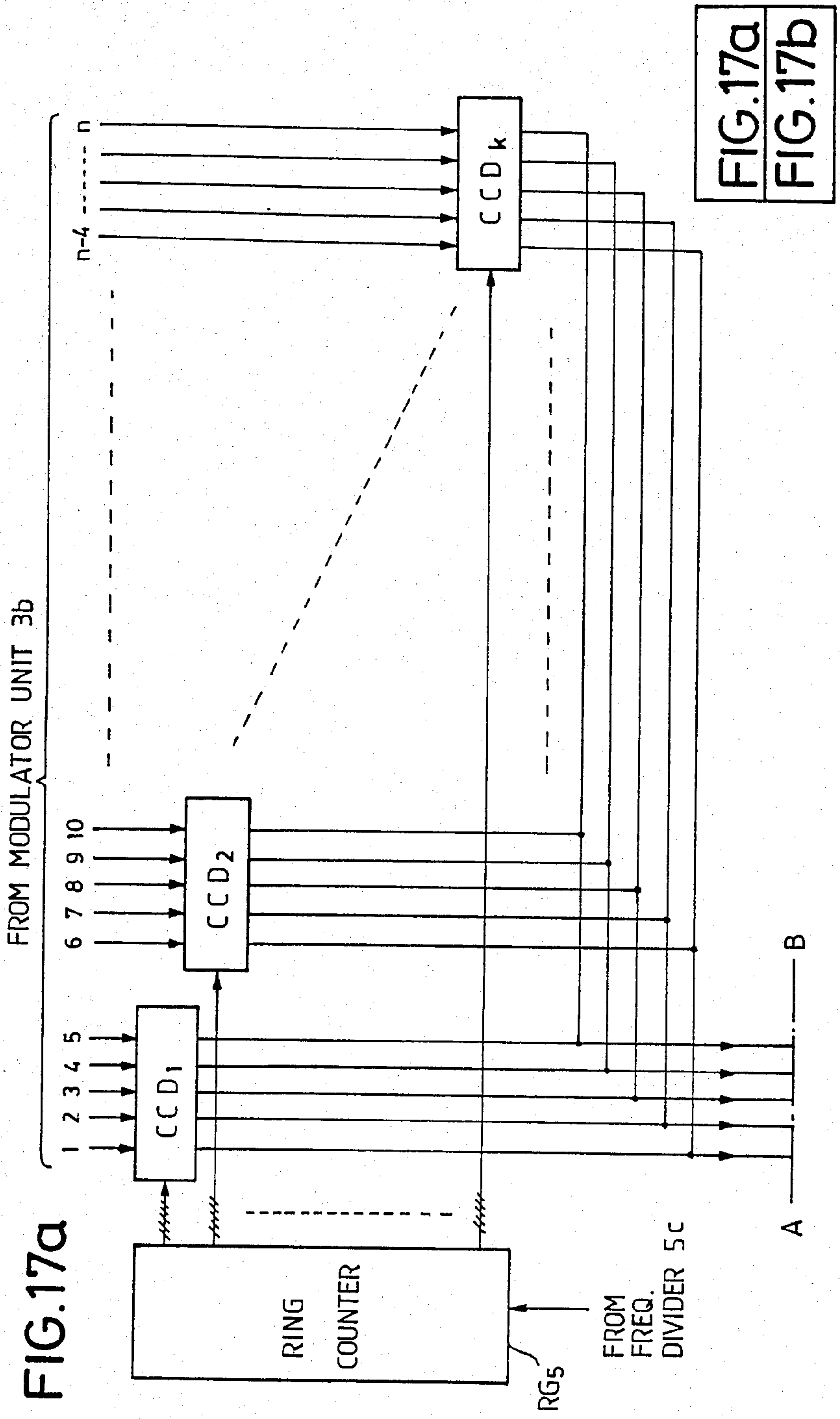
FIGS. 17*a*–17*b* are block diagrams of a modified form of the third embodiment.
Figure 17B:
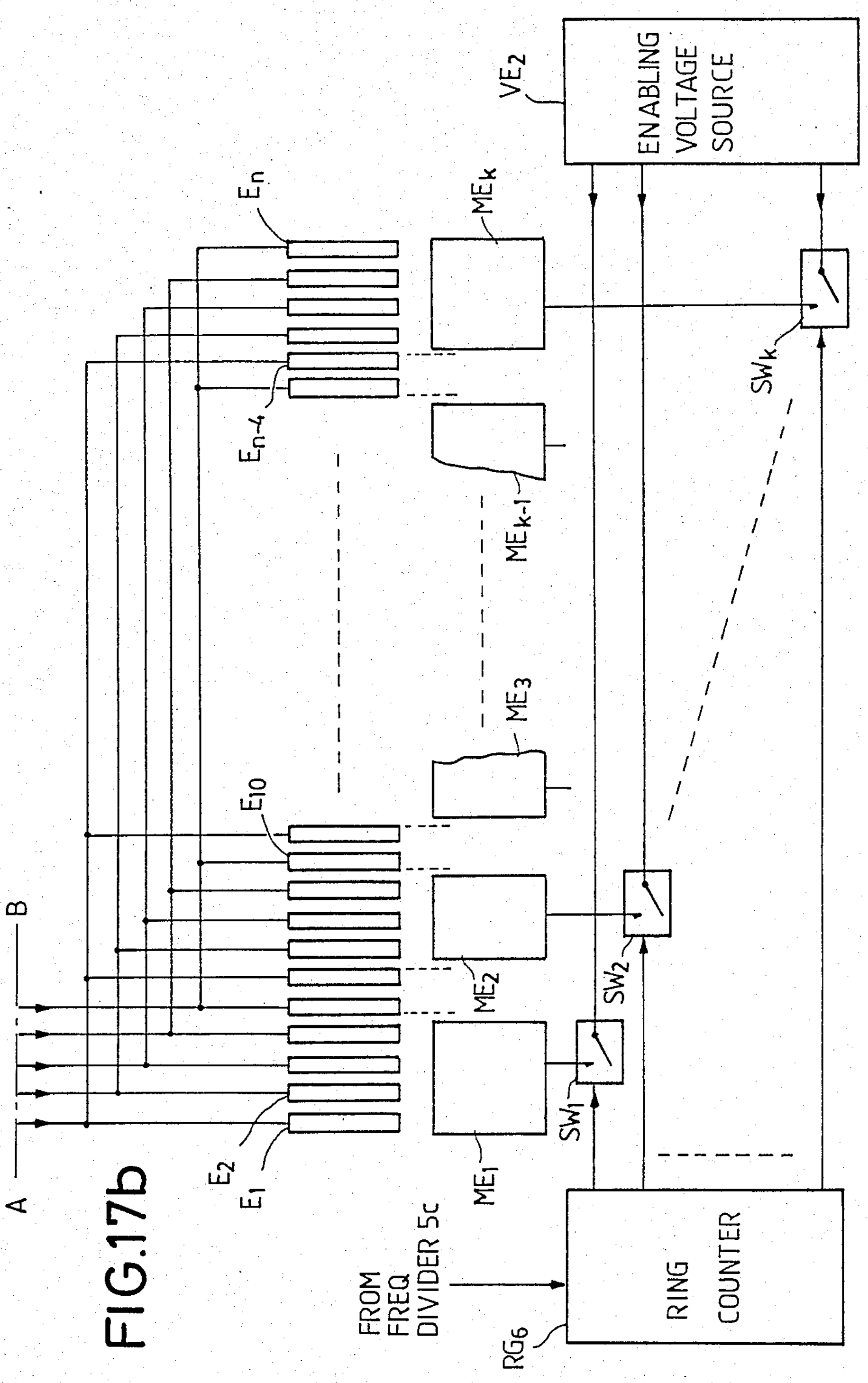

FIGS. 17*a*–17*b* are illustrations of a head control circuit adapted for use with the printer head of FIG. 12 in which an odd-number of recording electrodes is associated with each mesh electrode. For purposes of disclosure the printer head is shown as comprising mesh electrodes $ME_1$ to $ME_k$ and a block of five recording electrodes is associated with each mesh electrode.

In FIG. 17*a*, the #1 to #n modulator circuits are connected to a plurality of five-stage charge-coupled devices $CCD_1$ to $CCD_k$. Outputs of ring counter $RG_5$ are coupled to the charge-coupled devices $CCD_1$ to $CCD_k$ to drive them in sequence in response to an output of the frequency divider 5*c* so that each charge-coupled device provides a dot-sequential output signal. Corresponding output terminals of the charge-coupled devices are multiplied for connection to the recording electrodes $E_1$ to $E_n$ (FIG. 17*b*) which are multipled in a manner similar to those of the charge-coupled devices of FIG. 17*a*.

The mesh electrodes $ME_1$ to $ME_k$ are coupled through an array of switches $SW_1$ to $SW_k$ to an enabling voltage source $VE_2$ in response to an output of a ring counter $RG_6$ which is triggered by the frequency divider 5*c* as in the previous embodiments.

Figure 18:
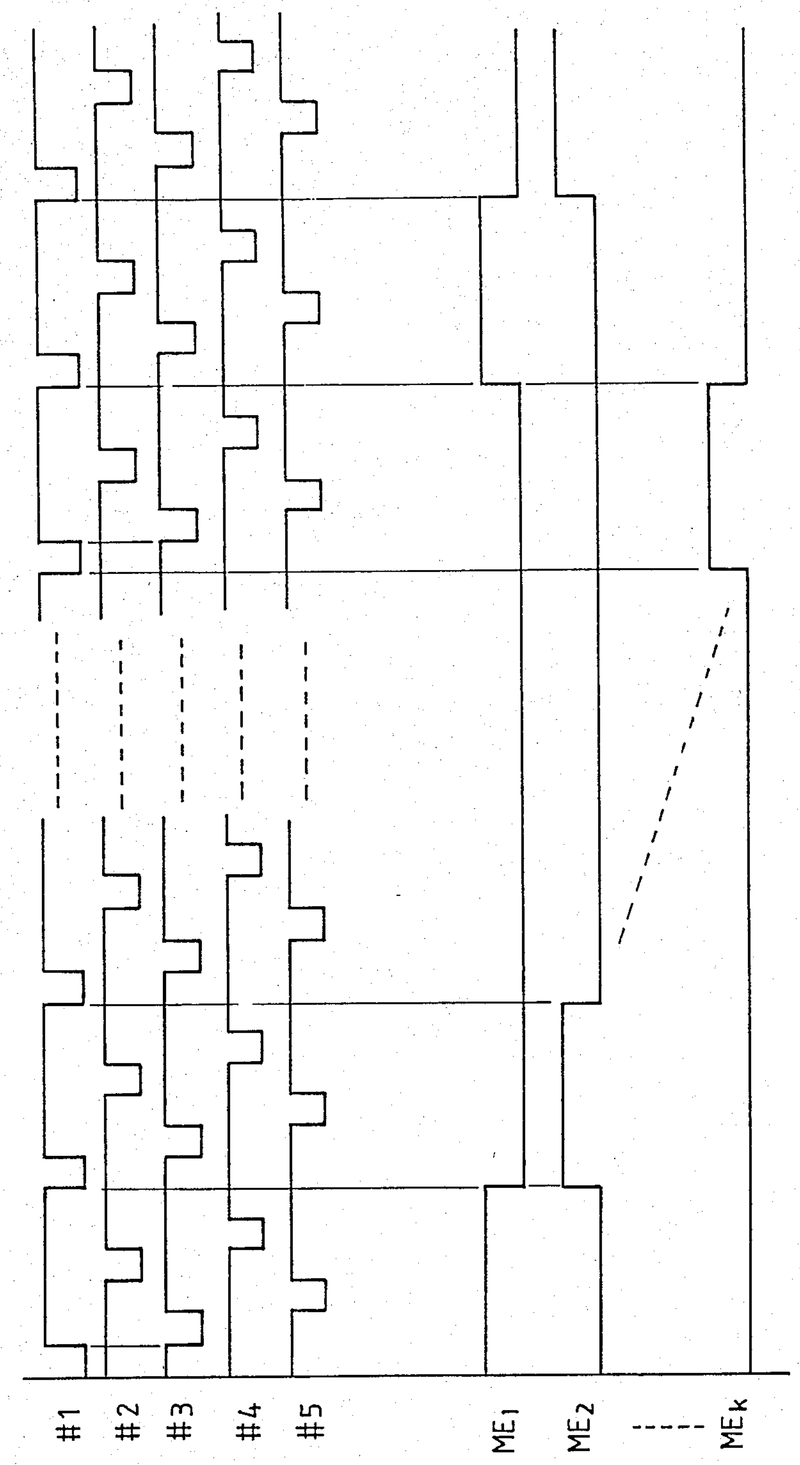
FIG. 18 is a timing diagram associated with the block diagram of FIGS. 17*a*–17*b*.

The storage locations of each of the charge-coupled devices $CCD_1$ to $CCD_k$ may be sequentially triggered. However, it is preferable that they be triggered in a manner similar to that shown in FIG. 9. FIG. 18 is an illustration of a timing diagram of voltages for enabling the recording electrodes in a manner similar to that shown in FIG. 9 and a timing diagram for sequentially enabling the mesh electrodes in the embodiment of FIGS. 13*a*–13*c*. The amplitude and timing relationships between the voltages applied to the underlying and mesh electrodes are exactly the same as shown in FIG. 16.

In a typical example, when the first mesh electrode $ME_1$ is enabled, the #1, #3, #5, #2 and #5 storage locations of charge-coupled device $CCD_1$ are triggered in sequence by the ring counter $RG_5$ to enable the recording electrodes $E_1$ to $E_5$. Similar operation continues until the electrodes $E_{n-4}$ to $E_n$ are sequentially enabled in response to the enablement of electrode $ME_k$.

Figure 19A:
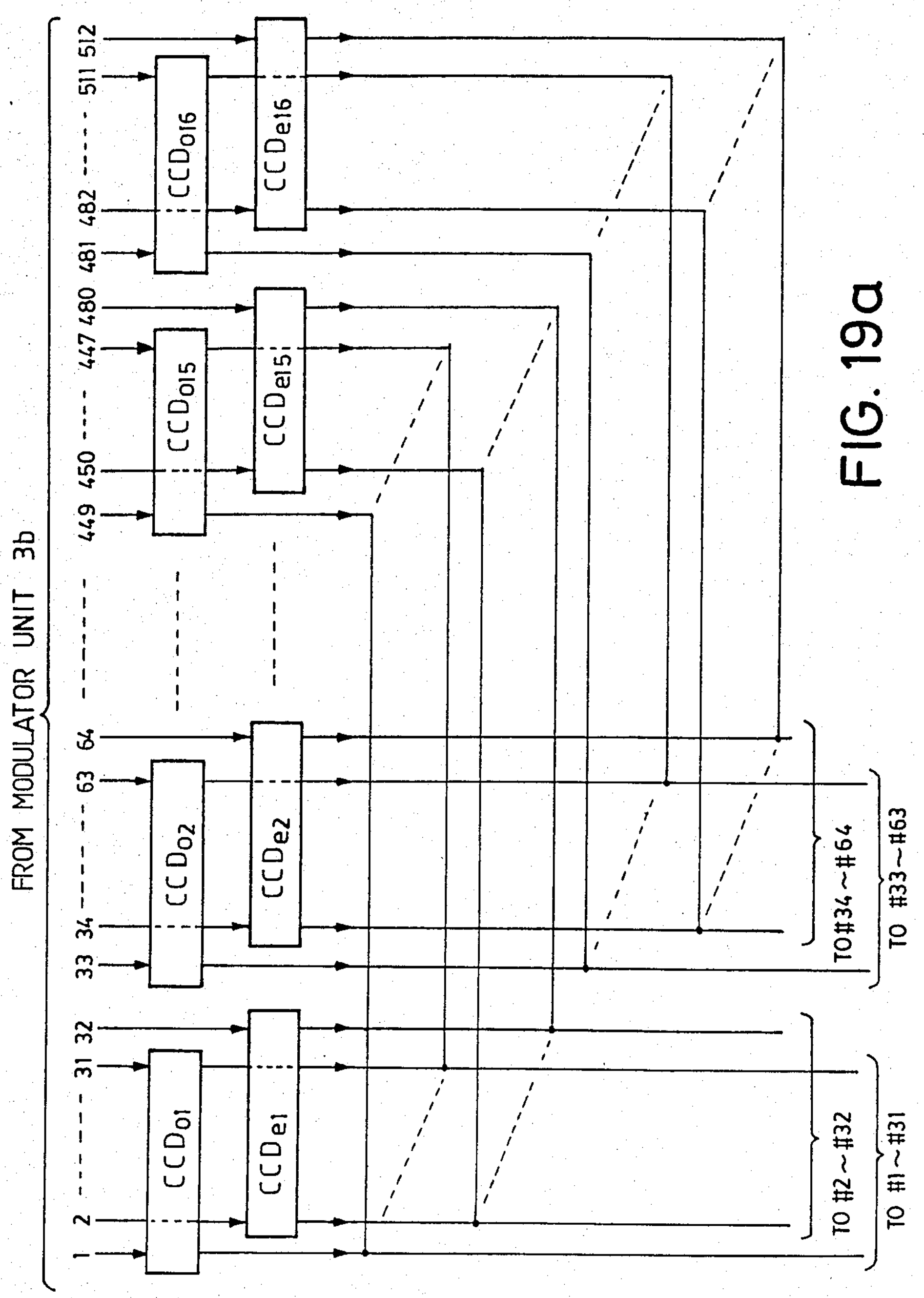
FIGS. 19*a*–19*c* are illustrations of a further modified form of the third embodiment of the invention.
Figure 19B:
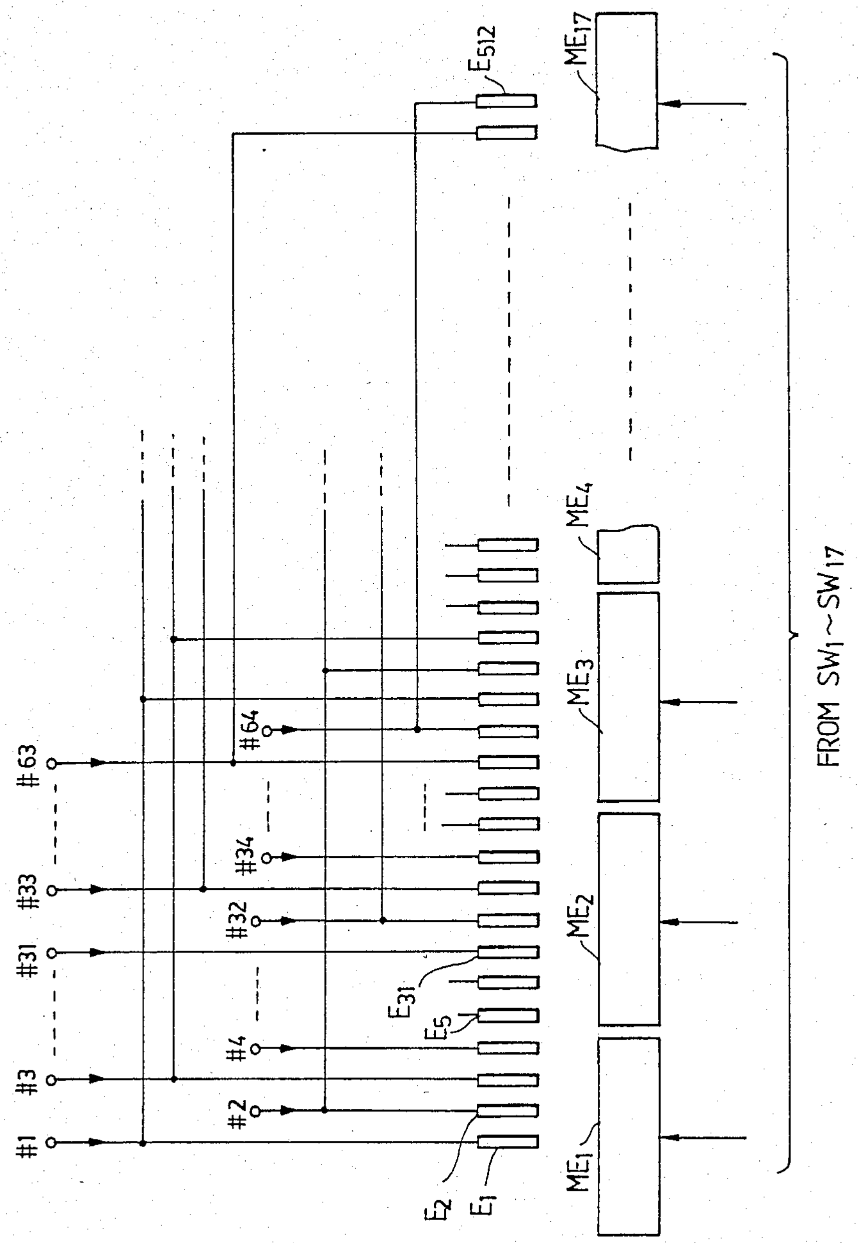
Figure 19C:
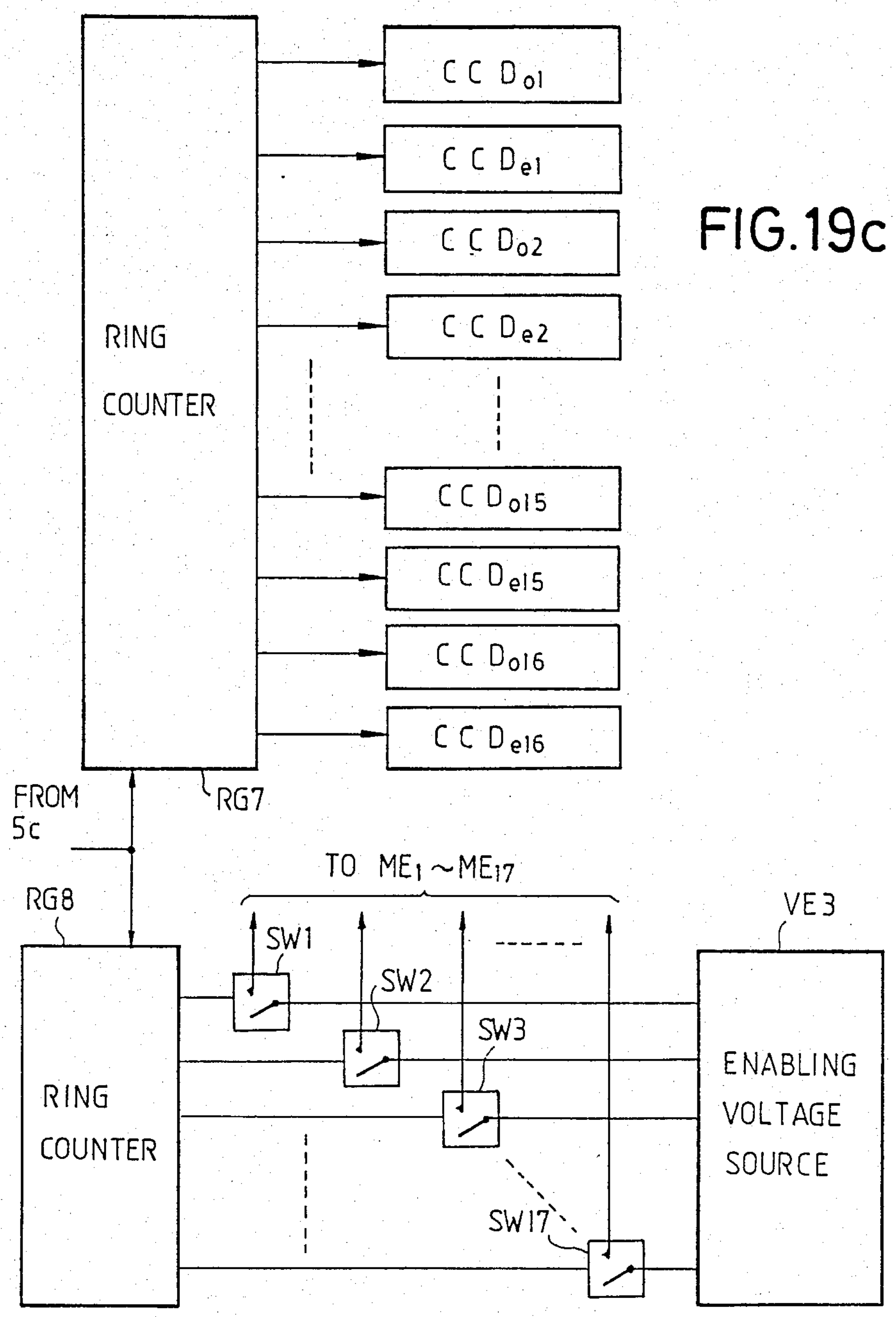

FIGS. 19*a*–19*c* are illustrations of a further embodiment of the present invention which eliminates the above-noted cross-coupling problem.

The arrangement of this embodiment is generally similar to that shown in FIGS. 13*a*–13*c* to the extent that the recording electrodes $E_1$ to $E_{512}$ are multipled in eight blocks of 64 each. As illustrated in FIG. 19*a*, charge-coupled devices $CCD_{o1}$–$CCD_{o16}$ and $CCD_{e1}$–$CCD_{e16}$ are associates with modulator circuits #1 to #512. Each of these charge-coupled devices has 16 storage positions. The corresponding storage positions of $CCD_{o1}$, $CCD_{o3}$, $CCD_{o5}$, $CCD_{o7}$, $CCD_{o9}$, $CCD_{o11}$, $CCD_{o13}$ and $CCD_{o15}$ are multipled for connection via inter-connecting terminals #1, #3 . . . #31 to recording electrodes $E_1$, $E_3$ . . . $E_{31}$. The corresponding storage positions of $CCD_{e1}$, $CCD_{e3}$, $CCD_{e5}$, $CCD_{e7}$, $CCD_{e9}$, $CCD_{e11}$, $CCD_{e13}$ and $CCD_{e15}$ are multipled for connection via inter-connecting terminals #2, #4 . . . #32 to recording electrodes $E_2$, $E_4$ . . . $E_{32}$. Likewise, the corresponding storage positions of $CCD_{o2}$, $CCD_{o4}$, $CCD_{o6}$, $CCD_{o8}$, $CCD_{o10}$, $CCD_{o12}$, $CCD_{o14}$ and $CCD_{o16}$ are multipled for connection via inter-connecting terminals #33, #35 . . . #63 to recording electrodes $E_{33}$, $E_{35}$ . . . $E_{63}$, and the corresponding storage positions of $CCD_{e2}$, $CCD_{e4}$, $CCD_{e6}$, $CCD_{e8}$, $CCD_{e10}$, $CCD_{e12}$, $CCD_{e14}$ and $CCD_{e16}$ are multipled for connection via inter-connecting terminals #34, #36 . . . #64 to recording electrodes $E_{34}$, $E_{36}$ . . . $E_{64}$.

AS shown in FIG. 19*b*, each block of 64 recording electrodes is subdivided into a first subgroup of 16 odd-numbered electrodes $E_1$, $E_3$ . . . $E_{31}$, a first subgroup of even-numbered 16 electrodes $E_2$, $E_4$ . . . $E_{32}$, a second subgroup of 16 odd-numbered electrodes $E_{33}$, $E_{35}$ . . . $E_{63}$, and a second subgroup of even-numbered electrodes $E_{34}$, $E_{36}$ . . . $E_{64}$. The corresponding electrodes of each subgroup are multipled for connection to the corresponding interconnecting terminals #1 to #64. The number of mesh electrodes $ME_1$ to $ME_{17}$ equals twice as many mesh electrodes as are in the embodiment of FIGS. 13*a*–13*c* plus one mesh electrode. The mesh electrodes $ME_1$ to $ME_{17}$ are arranged so that each mesh electrode is partially associated with preceding subgroups of recording electrodes and partially with adjacent subgroups. For example, the mesh electrode $ME_2$ is associated partially with subgroups $E_1$–$E_{31}$ and $E_2$–$E_{32}$ and partially with adjacent subgroups $E_{33}$–$E_{63}$ and $E_{34}$–$E_{64}$. On the other hand, the first and last mesh electrodes $ME_1$ and $ME_{17}$ are each associated with only part of the first and second subgroups.

Figure 20:
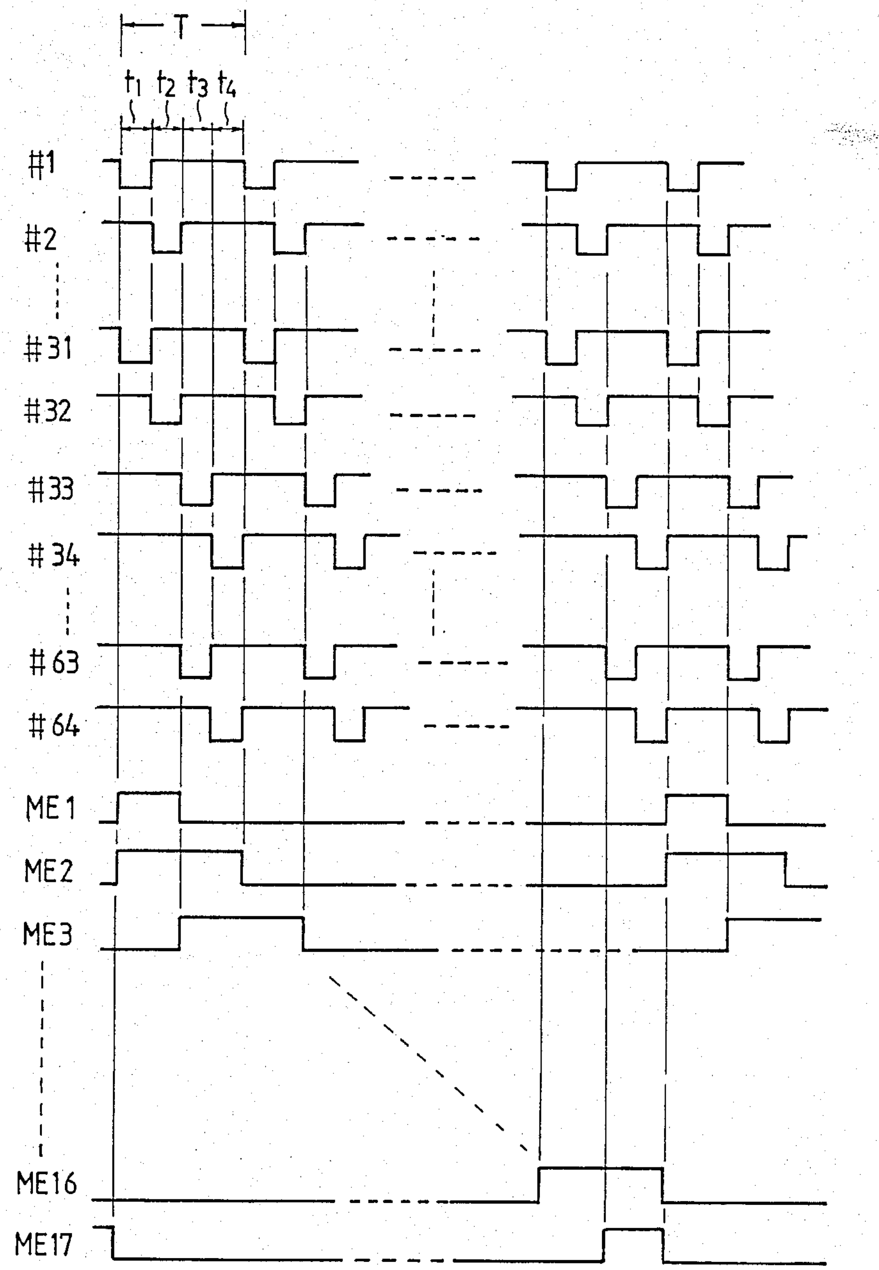
FIG. 20 is a timing diagram helpful for describing the operation of the embodiment of FIGS. 19*a*–19*c*.

These charge-coupled devices are controlled sequentially by a ring counter $RG_7$ (FIG. 19*c*). The mesh electrodes $ME_1$ to $ME_{17}$ are enabled by a voltage source $VE_3$ through switches $SW_1$ to $SW_{17}$ under the control of a ring counter $RG_8$. As is understood from FIG. 20, the print line interval T comprises four time slots $t_1$ to $t_4$ and the mesh electrodes are each enabled such that each mesh electrode (except for the first and last mesh electrodes $ME_1$ and $ME_{17}$) is impressed with a pulse having a duration T which partially overlaps the preceding and succeeding pulses applied to adjacent mesh electrodes. Each of mesh electrodes $ME_1$ and $ME_{17}$ is supplied with a pulse having half the duration in which the other mesh electrodes are enabled. When the mesh electrode $ME_1$ is enabled the charge-coupled devices $CCD_{o1}$ and $CCD_{e1}$ are successively triggered during time slots $t_1$ and $t_2$. As a result, the odd-numbered recording electrodes $E_1$ to $E_{31}$ are first enabled followed by the enablement of the even-numbered electrodes $E_2$ to $E_{32}$. The odd-numbered electrodes $E_{33}$ to $E_{63}$ are enabled during time slot $t_3$ and the even-numbered electrodes $E_{34}$ to $E_{64}$ are enabled during time slot $t_4$. Due to the partial association of the mesh electrodes with the subgroups of recording electrodes and due to the partial overlapped enablement of the mesh electrodes, a potential difference no longer occurs between recording and mesh electrodes when the enablement shifts from one multipled group to another. Specifically, when enablement shifts from electrodes $E_4$ to $E_5$ the simultaneous presence of the same potential on the mesh electrodes $ME_1$ and $ME_2$ eliminates the potential differences which would otherwise occur between the electrodes $E_4$ and $ME_2$ and between electrodes $E_5$ and $ME_1$. Therefore, no consideration is necessary for cross-coupling effects and mesh electrodes $ME_1$ to $ME_{17}$ can be spaced closely apart.

In the embodiments in which plural mesh electrodes are provided for operating the printer head on a time sharing basis, the application of potentials could be reversed so that the recording signals are applied to mesh electrodes and the selecting potentials are applied to the recording electrodes. It is also obvious that the present invention could be applied to any type of electroosmotic ink printers shown and described in the aforesaid copending applications.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method of operating an electroosmotic ink printer head including an array of recording electrodes successively arranged to define a print line along one edge of said head, an overlying electrode means in spaced overlying relationship with the recording electrodes and means provided between said electrode array and said overlying electrode means for electroosmotically moving ink in a direction toward said print line and in an opposite direction depending on an electrical potential applied to said recording electrodes with respect to the overlying electrode means, said method comprising the steps of:

(a) storing a video input signal in a plurality of storage locations corresponding to said recording electrodes; and (b) disabling a first group of said recording electrodes by applying thereto a first potential to cause said ink to move in the opposite direction while enabling a second group of said recording electrodes by applying thereto a second potential to cause said ink to move toward said print line as a function of the stored signals for said second group of recording electrodes, and subsequently disabling said second group while enabling said first group, the electrodes of each group being located alternatively with those of the other.

2. A method as claimed in claim 1, wherein said recording electrodes are organized into a plurality of blocks each having at least five such recording electrodes, the electrodes of each block being further organized with the corresponding electrodes of the other blocks to form at least five groups, and wherein the step (b) comprises applying said second potential to the electrodes of each block in such a sequence that the successively applied electrodes are spaced a distance greater than the distance at which the recording electrodes are spaced apart.

3. A printer adapted to receive an input signal for printing an image, comprising an electroosmotic ink printer head including an array of recording electrodes successively arranged to define a print line along one edge of said head, an overlying electrode means in spaced overlying relationship with the recording electrodes, and means provided between said electrode array and said overlying electrode means for electroosmotically moving ink in a direction toward said print line and in an opposite direction depending on an electrical potential applied to said recording electrodes with respect to the overlying electrode means, said recording electrodes being organized in first and second groups, the electrodes of each group being located adjacent to the corresponding electrodes of the other group, said ink moving means including:

memory means for storing said input signal in a plurality of storage locations corresponding to said recording electrodes;

modulating means for modulating a first electrical potential with the signals stored in said storage locations to generate individual recording signals corresponding to said recording electrodes, said first potential having a polarity which causes the ink to move toward the print line;

timing means for generating a timing signal to define a periodic interval during which said image is to be printed on said print line, said interval being divided into at least first and second time slots; and control means for activating a portion of said recording electrodes by sequentially applying said individual recording signals to said first and second groups during said first and second time slots, respectively, to cause the ink on the activated electrodes to move toward the print line to form said image on a surface, and for deactivating the remainder of said recording electrodes by applying a second electrical potential to the electrodes of the group to which said recording signals are not applied, said second potential having a polarity which causes the ink to move in the opposite direction.

4. A printer as claimed in claim 3, wherein said recording electrodes are organized into a plurality of successively arranged blocks, the electrodes of each block being connected in multiple with the corresponding electrodes of the other blocks to form said first and second groups, the electrodes of each of said first and second groups being arranged alternately with those of the other group, wherein said control means comprises:

means for sequentially applying said individual recording signals to the electrodes of each block; and means for simultaneously applying said second potential to the electrodes of each block other than the electrodes to which said recording signals are applied.

5. A printer as claimed in claim 3, wherein said recording electrodes are organized into a plurality of like blocks each comprising at least five successively arranged electrodes, and said periodic interval is divided into at least five time slots, and wherein said control means comprises:

means for sequentially applying said recording signals to the electrodes of each block during each of said time slots such that the electrodes which are successively applied with such recording signals are spaced a distance greater than the distance by which said recording electrodes are spaced apart; and means for simultaneously applying said second potential to the electrodes of each block other than the electrode to which said recording signal is applied.

6. A printer as claimed in claim 3, 4 or 5, further comprising means for momentarily increasing said second potential upon the application thereof to said recording electrodes.

7. A printer as claimed in claim 6, further comprising means for momentarily increasing the potential of said recording signals upon the application thereof to said recording electrodes.

8. A printer as claimed in claim 3, wherein said recording electrodes are organized into a plurality of successively arranged blocks, the electrodes of each block being connected in multiple with the corresponding electrodes of the other blocks to form a plurality of groups, the electrodes of each of said groups being arranged alternately with those of the other group, and wherein said overlying electrode means comprises a plurality of successively arranged electrode segments each being associated with one or more of said blocks, further comprising means for sequentially activating said electrode segments, and means for selectively coupling said individual recording signals to said common terminals.

9. A printer as claimed in claim 8, wherein said electrode segments are in overlying relationship in one-to-one correspondence with said blocks of recording electrodes.

10. A printer as claimed in claim 8, wherein each of said blocks is associated with a set of three successively arranged electrode segments.

11. A printer as claimed in claim 10, wherein said activating means comprises means for simultaneously activating two of said successive electrode segments for a period during which the electrodes of said first and second groups are successively activated.

12. A printer as claimed in claim 8, 9, 10 or 11, wherein each of said block comprises an even number of said recording electrodes.

13. A printer as claimed in claim 8 or 9, wherein said electrode segments are spaced apart by a distance such that at least two of said recording electrodes are accommodated between said electrode segments.

14. A printer as claimed in claim 8, wherein each of said blocks comprises at least five successively arranged electrodes, and said periodic interval is divided into at least five time slots, and wherein said control means comprises:

means for sequentially applying said recording signals to the electrodes of each block during each of said time slots such that the electrodes which are successively applied with the recording signals are spaced a distance greater than the distance by which said recording electrodes are spaced apart; and means for simultaneously applying said second potential to the electrodes of each block other than the electrode to which said recording signal is applied.

15. A printer as claimed in claim 3, 4, 5, 8, 9, 10, 11 or 14, wherein said means for electroosmotically moving ink comprises a dielectric support on which said recording electrodes are successively arranged and a porous member disposed between said electrode array and said overlying electrode means, and wherein said overlying electrode means is of a structure which allows said ink to permeate therethrough to said porous member, said porous member having a straight edge spaced inwardly from said edge of the head to expose an area including a portion of each recording electrode and a portion of said dielectric support for enabling said ink to move about said exposed area.

16. A printer as claimed in claim 6, wherein said means for electroosmotically moving ink comprises a dielectric support on which said recording electrodes are successively arranged and a porous member disposed between said electrode array and said overlying electrode means, and wherein said overlying electrode means is of a structure which allows said ink to permeate therethrough to said porous member, said porous member having a straight edge spaced inwardly from said edge of the head to expose an area including a portion of each recording electrode and a portion of said dielectric support for enabling said ink to move about said exposed area.

17. A printer as claimed in claim 15, further comprising a pair of auxiliary electrodes each being located adjacent said edge of said support and each outermost one of said recording electrodes, and means for biasing said auxiliary electrodes with respect to said overlying electrode means to a potential having the same polarity as said second potential.

18. A printer as claimed in claim 6, wherein said means for electroosmotically moving ink comprises a dielectric support on which said recording electrodes are successively arranged and a porous member disposed between said electrode array and said overlying electrode means, and wherein said overlying electrode means is of a structure which allows said ink to permeate therethrough to said porous member, said porous member having a straight edge spaced inwardly from said edge of the head to expose an area including a portion of each recording electrode and a portion of said dielectric support for enabling said ink to move about said exposed area, further comprising a pair of auxiliary electrodes each being located adjacent to said edge of said support and to each outermost one of said recording electrodes and means for biasing said auxiliary electrodes with respect to said overlying electrode means to a potential having the same polarity as said second potential.

19. A method of operating an electroosmotic ink printer head responsive to a signal containing visual information to be printed, including an array of recording electrodes successively arranged to define a print line along one edge of said head, overlying electrode means in spaced overlying relationship with the recording electrodes, and means provided between said electrode array and said overlying electrode means for electroosmotically moving ink in a first direction toward said print line and in an opposite second direction depending on the amplitude of an electrical potential applied to said recording electrodes relative to the amplitude of an electric potential of an overlying electrode means, said method comprising the step of:

disabling a first group of said recording electrodes by applying thereto a first potential to cause said ink to move in the second direction while enabling a second group of said recording electrodes by applying thereto a second potential to cause said ink to move in the first direction toward said print line as a function of certain information in the signal, and subsequently disabling said second group by applying a potential thereto to cause ink to move in the second direction away from said print line while enabling said first group by applying a potential thereto to cause ink to move in the first direction toward the print line as a function of further information in the signal, the electrodes of each group being located alternately with those of the other.

20. A printer responsive to a signal containing visual information to be printed, the printer comprising an electroosmotic ink printer head including:

an array of recording electrodes successively arranged to define a print line, overlying electrode means spaced in the overlying relationship with the recording electrodes, and means provided between said electrode array and said overlying electrode means for electroosmotically moving ink in a first direction toward said print line and in an opposite second direction depending upon an electric potential applied to said recording electrodes relative to the amplitude of an electric potential of the overlying electrode means, said means for electroosmotically moving being responsive to the signal and including first and second potential sources connected to said recording electrodes, means for connecting said first potential source to a first group of said recording electrodes to cause ink to move in said second direction while applying the second potential and a voltage indicative of certain information in the signal to a second group of said recording electrodes to cause ink to move in the first direction toward said print line as a function of the certain information in the signal, and for subsequently connecting said first potential source to the second group of said recording electrodes to cause said ink to move in the second direction while applying the first potential source and a voltage indicative of other information in the signal to the first group of said recording electrodes to cause said ink to move in the first direction toward said print line as a function of the further information in the signal.

* * * * *